US012007241B2

(12) United States Patent
Sugimoto et al.

(10) Patent No.: US 12,007,241 B2
(45) Date of Patent: Jun. 11, 2024

(54) DETERMINING CHARGING TRAVELING ROUTE FOR BATTERY-POWERED MOVING BODY

(71) Applicant: TOYOTA JIDOSHA KABUSHIKI KAISHA, Toyota (JP)

(72) Inventors: Kazuhiro Sugimoto, Ashigarakami-gun (JP); Kotoru Sato, Susono (JP); Kumiko Katsumata, Susono (JP); Shun Ota, Susono (JP); Takahiro Suzuki, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 421 days.

(21) Appl. No.: 17/393,456

(22) Filed: Aug. 4, 2021

(65) Prior Publication Data

US 2022/0120576 A1  Apr. 21, 2022

(30) Foreign Application Priority Data

Oct. 21, 2020  (JP) .................................. 2020-176942

(51) Int. Cl.
*G01C 21/34* (2006.01)
*B60L 58/12* (2019.01)
*H04L 67/12* (2022.01)

(52) U.S. Cl.
CPC .......... *G01C 21/3469* (2013.01); *B60L 58/12* (2019.02); *G01C 21/3484* (2013.01); *H04L 67/12* (2013.01)

(58) Field of Classification Search
CPC . G01C 21/3469; G01C 21/3484; B60L 58/12; H04L 67/12
See application file for complete search history.

(56) References Cited

U.S. PATENT DOCUMENTS

| | | | | |
|---|---|---|---|---|
| 2013/0079962 | A1 | 3/2013 | Ishikawa et al. | |
| 2014/0125279 | A1* | 5/2014 | Juhasz | H02J 7/00 320/109 |
| 2014/0163877 | A1* | 6/2014 | Kiyama | G01C 21/3469 701/533 |
| 2016/0273927 | A1 | 9/2016 | Kitajima et al. | |
| 2017/0088000 | A1* | 3/2017 | Payne | B60L 53/64 |
| 2018/0025635 | A1* | 1/2018 | Cheaz | B60W 30/00 701/23 |

(Continued)

FOREIGN PATENT DOCUMENTS

| | | |
|---|---|---|
| JP | 2011-227875 A | 11/2011 |
| JP | 2013-070515 A | 4/2013 |

(Continued)

*Primary Examiner* — James J Lee
*Assistant Examiner* — Steven Vu Nguyen
(74) *Attorney, Agent, or Firm* — Finnegan, Henderson, Farabow, Garrett & Dunner, LLP

(57) ABSTRACT

A server includes a processor to acquire a current position of a moving body used by a user, a remaining battery level of a rechargeable battery of the moving body used by the user, and a first destination of the user, and in a case where a new second destination different from the first destination is input, set, for the moving body, a charging travelling route passing a charging path capable of charging the battery on a way from the current position to the second destination based on the remaining battery level.

9 Claims, 15 Drawing Sheets

(56) References Cited

U.S. PATENT DOCUMENTS

2020/0193835 A1  6/2020  Kamata et al.

FOREIGN PATENT DOCUMENTS

| JP | 2015-001466 A | 1/2015 |
| JP | 2015-094705 A | 5/2015 |
| JP | 2019-095196 A | 6/2019 |
| JP | 2020-042853 A | 3/2020 |
| JP | 2020-095478 A | 6/2020 |

* cited by examiner

DETERMINING CHARGING TRAVELING ROUTE FOR BATTERY-POWERED MOVING BODY

CROSS-REFERENCE TO RELATED APPLICATION(S)

The present application claims priority to and incorporates by reference the entire contents of Japanese Patent Application No. 2020-176942 filed in Japan on Oct. 21, 2020.

BACKGROUND

The present disclosure relates to a server, a charging system, and a recording medium.

In Japanese Laid-open Patent Publication No. 2013-70515, a technique for predicting a required power amount of a battery required when a moving body such as an electric vehicle travels on a planned travelling route to a destination is known.

SUMMARY

There is a need for provide a server, a charging system, and a recording medium storing a program that make it possible to respond according to a new destination even in a case where a user's destination is changed.

According to an embodiment, a server includes a processor to acquire a current position of a moving body used by a user, a remaining battery level of a rechargeable battery of the moving body used by the user, and a first destination of the user, and in a case where a new second destination different from the first destination is input, set, for the moving body, a charging travelling route passing a charging path capable of charging the battery on a way from the current position to the second destination based on the remaining battery level.

According to an embodiment, a charging system includes: a moving body having a rechargeable battery; and a server having a processor configured to acquire a current position of the moving body used by a user, a remaining battery level of the rechargeable battery of the moving body used by the user, and a first destination of the user, and in a case where a new second destination different from the first destination is input, set, for the moving body, a charging travelling route passing a charging path capable of charging the battery on a way from the current position to the second destination based on the remaining battery level.

According to an embodiment, there is a non-transitory computer-readable recording medium storing a program for causing a processor to acquire a current position of a moving body used by a user, a remaining battery level of a rechargeable battery of the moving body used by the user, and a first destination of the user, and in a case where a new second destination different from the first destination is input, set, for the moving body, a charging travelling route passing a charging path capable of charging the battery on a way from the current position to the second destination based on the remaining battery level.

DETAILED DESCRIPTION

In the related art, for example, Japanese Laid-open Patent Publication No. 2013-70515 has a problem that in a case where the destination is changed due to a change of user's schedule, a larger power amount than the predicted required power amount becomes necessary, and there arises shortage in remaining battery level.

Hereinafter, a charging system according to embodiments of the present disclosure will be described with reference to the drawings. The present disclosure is not limited by the following embodiments. In the following description, identical parts are given identical reference signs.

First Embodiment

Overview of Charging System

Figure 1:
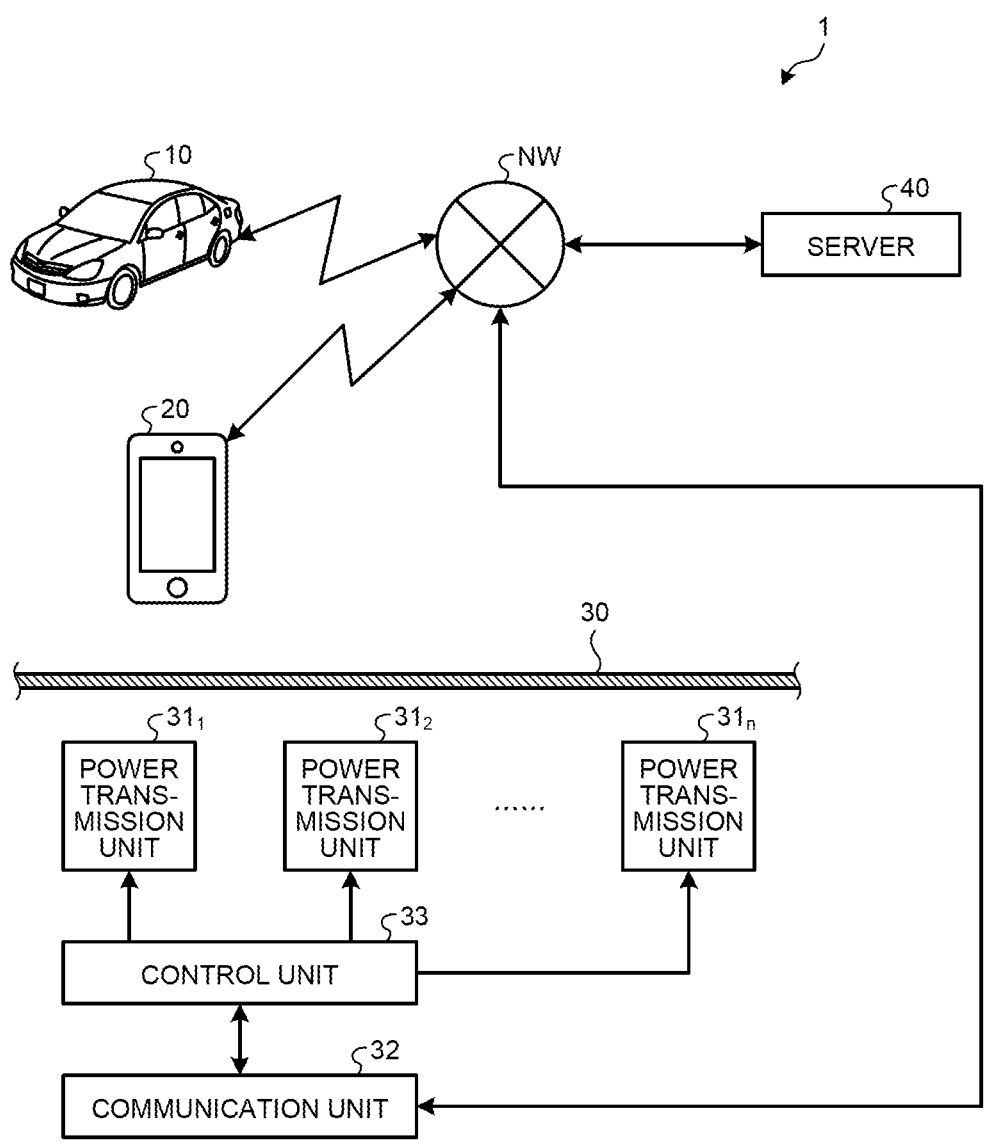
FIG. 1 is a diagram schematically illustrating a configuration of a charging system according to a first embodiment.

FIG. 1 is a diagram schematically illustrating a configuration of a charging system according to a first embodiment. A charging system 1 illustrated in FIG. 1 includes a moving body 10, a communication terminal, a charging path 30, and a server 40. The charging system 1 is configured such that these members can communicate with each other through a network NW. This network NW is, for example, the Internet network, a mobile phone network, or the like.

Functional Configuration of Moving Body

Figure 2:
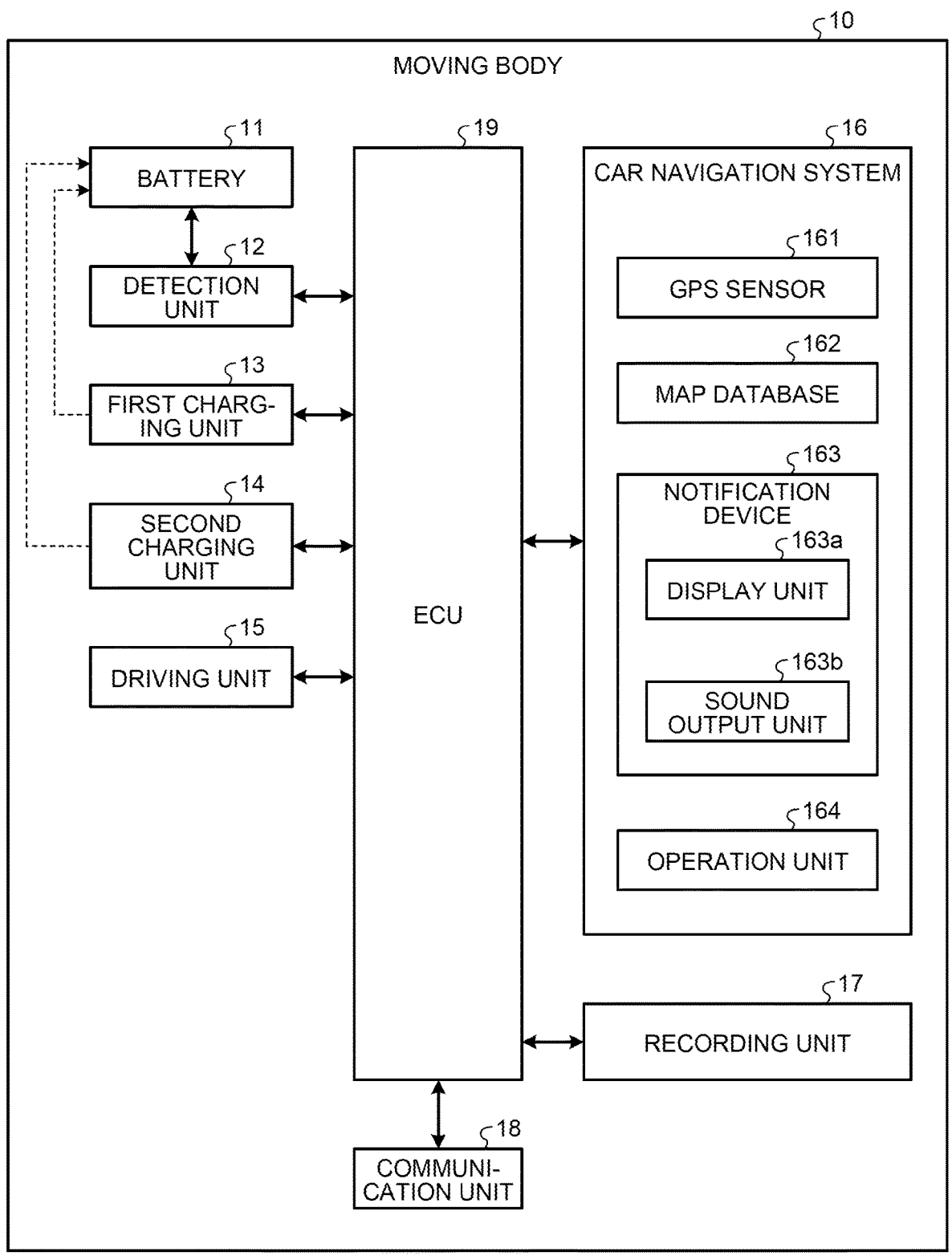
FIG. 2 is a block diagram illustrating a functional configuration of a moving body according to the first embodiment.

First, a functional configuration of the moving body 10 will be described. FIG. 2 is a block diagram illustrating a functional configuration of the moving body 10. The moving body 10 illustrated in FIG. 2 includes a battery 11, a detection unit 12, a first charging unit 13, a second charging unit 14, a driving unit 15, a car navigation system 16, a recording unit 17, a communication unit 18, and an electronic control unit (ECU) 19. Although a vehicle such as an electric vehicle (EV), a plug-in hybrid vehicle (PHV), or a fuel cell electric vehicle (FCEV) is described as the moving body 10 in the following description, the moving body 10 is not limited to this and can be, for example, a motorcycle equipped with a motor and a battery, an electric two-wheeled vehicle such as a bicycle or a kickboard, a three-wheeled vehicle, a bus, a truck, a ship, or a drone. Further, the moving body 10 automatically moves toward a destination under control of the server 40. Of course, a user using the moving body 10 (user in the moving body 10) can move the moving body 10 toward a destination desired by the user by operating members such as a steering.

The battery 11 is, for example, a rechargeable secondary battery such as a nickel metal hydride battery or a lithium ion battery. The battery 11 stores high-voltage DC power for driving the moving body 10.

The detection unit 12 detects a remaining battery level (SOC), a temperature, a state of health (SOH), a voltage value, and a current value of the battery 11, and outputs a detection result to the ECU 19. The detection unit 12 is constituted by various battery sensors, a temperature sensor, and the like.

The first charging unit 13 is electrically connected to the battery 11 and is electrically connectable to the charging device via a charging port. The first charging unit 13 converts (transforms) an alternating current supplied from the charging device (electric power supplied by a normal AC charging method) into a voltage and electric power with which the battery 11 can be charged and outputs the alternating current. The first charging unit 13 is constituted by an AC/DC converter, a DC/DC converter, and the like.

The second charging unit 14 is electrically connected to the battery 11, receives power transmitted in a non-contact manner during travelling on the charging path 30 described later, converts the received power into a voltage and power that can charge the battery 11, and outputs the power. The second charging unit 14 includes a receiving coil, an LC resonance circuit, a filter circuit, a rectifier circuit including a capacitor, and the like.

The driving unit 15 supplies a driving force to drive wheels of the moving body 10 based on electric power supplied from the battery 11 under control of the ECU 19. The driving unit 15 is constituted by a motor and the like.

The car navigation system 16 includes a global positioning system (GPS) sensor 161, a map database 162, a notification device 163, and an operation unit 164.

The GPS sensor 161 receives signals from a plurality of GPS satellites or transmitting antennas, and calculates a position (longitude and latitude) of the moving body 10 based on the received signals. The GPS sensor 161 is constituted by a GPS receiving sensor and the like. In the embodiment, orientation accuracy of the moving body 10 may be improved by mounting a plurality of GPS sensors 161.

The map database 162 records various map data. The map database 162 is constituted by a recording medium such as a hard disk drive (HDD) or a solid state drive (SSD).

The notification device 163 includes a display unit 163a for displaying an image, a map, video, and character information and a sound output unit 163b for generating sounds such as voice and alarm sound. The display unit 163a is a display such as a liquid crystal display or an organic electro luminescence (EL) display. The sound output unit 163b is a speaker or the like.

The operation unit 164 receives user's operation input and outputs signals corresponding to various received operations to the ECU 19. The operation unit 164 is realized by using a touch panel, buttons, switches, a jog dial, and the like.

The car navigation system 16 configured in this way superimposes a current position of the moving body 10 acquired by the GPS sensor 161 on a map corresponding to the map data recorded in the map database 162 and thereby notifies a user of information including a road on which the moving body 10 is currently travelling, a route to a destination, and the like by the display unit 163a and the sound output unit 163b.

The recording unit 17 records various kinds of information about the moving body 10. The recording unit 17 records, for example, CAN data of the moving body 10 input from the ECU 19 and various programs executed by the ECU 19. The recording unit 17 is constituted by a dynamic random access memory (DRAM), a read only memory (ROM), a flash memory, a hard disk drive (HDD), a solid state drive (SSD), or the like.

The communication unit 18 transmits CAN data and the like to the server 40 through the network NW under control of the ECU 19. The CAN data includes a remaining battery level (SOC) of the battery 11, SOH, and the like. The communication unit 18 is constituted by a communication module or the like capable of transmitting and receiving various kinds of information.

The ECU 19 is constituted by a memory and a processor having hardware such as a central processing unit (CPU). The ECU 19 controls each unit of the moving body 10. The ECU 19 moves the moving body 10 to the charging path 30 or a user's destination by driving the driving unit 15 in accordance with a signal and an instruction transmitted from the server 40 via the communication unit 18, the current position of the moving body 10 detected by the car navigation system 16, and the like.

Functional Configuration of Communication Terminal

Figure 3:
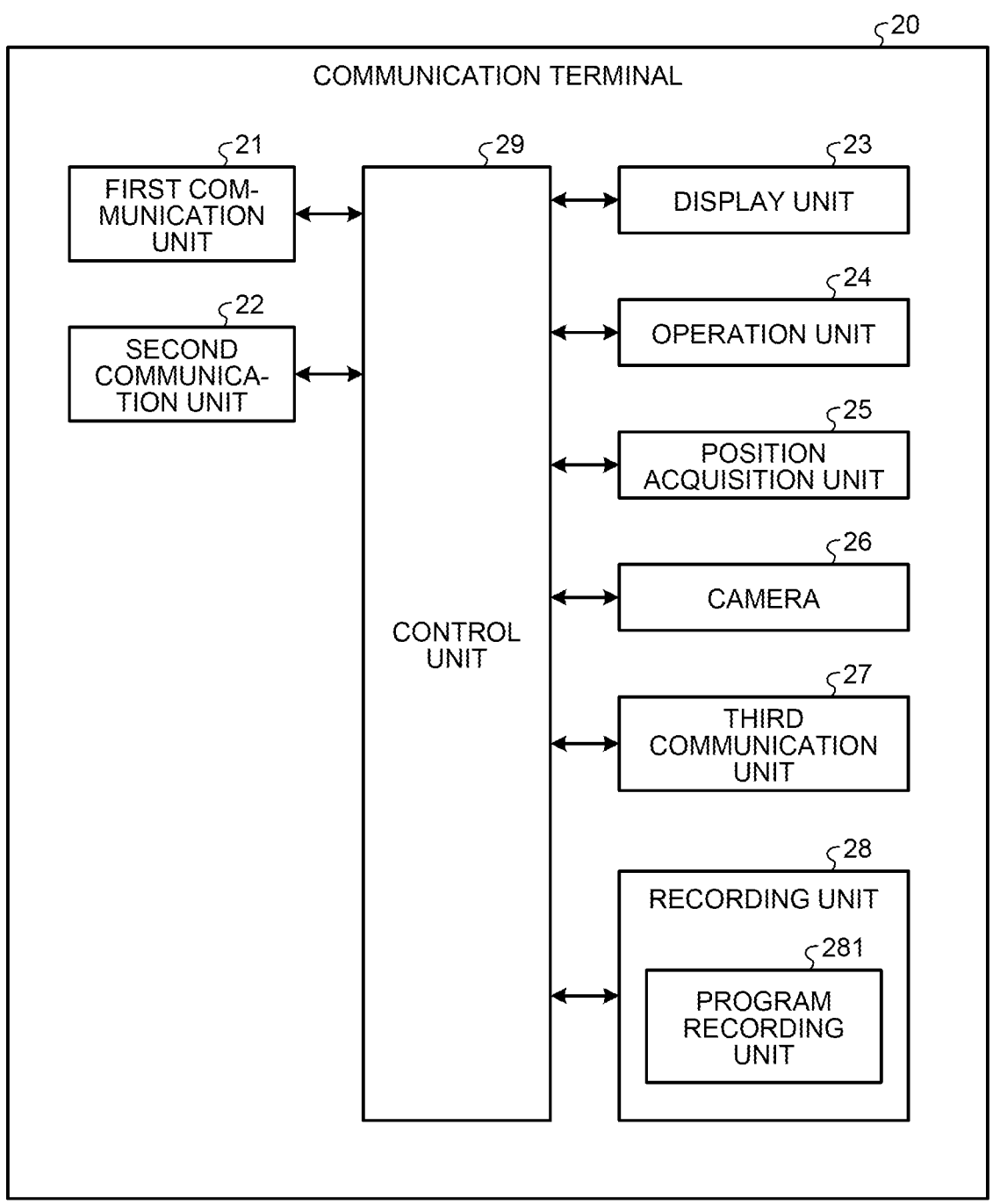
FIG. 3 is a block diagram illustrating a functional configuration of a communication terminal according to the first embodiment.

Next, a functional configuration of a communication terminal 20 will be described. FIG. 3 is a block diagram illustrating the functional configuration of the communication terminal 20.

The communication terminal 20 illustrated in FIG. 3 includes a first communication unit 21, a second communication unit 22, a display unit 23, an operation unit 24, a position acquisition unit 25, a camera 26, a third communication unit 27, a recording unit 28, and a control unit 29. Although it is assumed that the communication terminal 20 is a mobile phone in the following description, this is not restrictive, and the communication terminal 20 can be, for example, a tablet terminal or a wearable terminal.

The first communication unit 21 receives various kinds of information from the moving body 10 under control of the control unit 29 and outputs the received various kinds of information to the control unit 29. The first communication unit 21 is, for example, a communication module that supports Bluetooth (registered trademark) or the like.

The second communication unit 22 receives various kinds of information from the moving body 10 under control of the control unit 29 and outputs the received various kinds of information to the control unit 29. The second communication unit 22 is a communication module that supports Wi-Fi (registered trademark) or the like.

The display unit 23 displays various kinds of information under control of the control unit 29. The display unit 23 is a display panel such as a liquid crystal display or an organic electro luminescence (EL) display.

The operation unit 24 receives entry of various user's operations and outputs signals corresponding to the received various operations to the control unit 29. The operation unit 24 is constituted by a touch panel, switches, buttons, and the like.

The position acquisition unit 25 acquires a position of the communication terminal 20 and outputs the acquired position to the control unit 29. The position acquisition unit 25 is realized, for example, by using a plurality of GPS receiving sensors.

The camera 26 generates image data by photographing a subject under control of the control unit 29 and outputs this image data to the control unit 29. The camera 26 is realized by one or more optical systems and a charge coupled device (CCD) or complementary metal oxide semiconductor (CMOS) image sensor that generates image data by capturing an image of a subject imaged by the optical systems.

The third communication unit 27 transmits destination information on a destination set by using the operation unit 24 by the user through communication with the server 40 over the network NW under control of the control unit 29. The third communication unit 27 is a communication module that supports communication standards using a mobile phone line such as a 4th generation mobile communication system (4G) and a 5th generation mobile communication system (5G).

The recording unit 28 records various kinds of information about the communication terminal 20 and various programs executed by the communication terminal 20. The recording unit 28 is realized by a DRAM, a ROM, a flash memory, an SSD, a memory card, or the like.

The control unit 29 is constituted by a memory and a processor having hardware such as a CPU. The control unit 29 controls each unit of the communication terminal 20. In the first embodiment, the control unit 29 functions as a second processor.

Functional Configuration of Charging Path

Next, a functional configuration of the charging path 30 will be described. The charging path 30 illustrated in FIG. 1 includes power transmission units $31_1 \ldots 31_n$ (n=an integer of 2 or more), a communication unit 32, and a control unit 33. Since the power transmission units $31_1 \ldots 31_n$ have similar functional configurations, any of the power transmission units $31_1 \ldots 31_n$ is simply referred to as the power transmission unit 31.

The power transmission unit 31 converts an alternating current of a predetermined voltage value (for example, 6600 V) supplied from an external AC power source into a predetermined voltage value and transmits the power to the second charging unit 14 of the moving body 10 in a non-contact manner through a magnetic field (wireless AC charging) under control of the control unit 33. The power transmission unit 31 includes a transmission coil, an AC/DC converter, an inverter, an LC resonance circuit, a filter circuit, a rectifier circuit including a capacitor, and the like. The power feeding method may be either a magnetic field coupling method or an electric field coupling method.

The communication unit 32 transmits and receives various kinds of information through communication with the moving body 10, the communication terminal 20, and the server 40 over the network NW under control of the control unit 33. The communication unit 32 is, for example, a communication module.

The control unit 33 is constituted by a memory and a processor having hardware such as a CPU. The control unit 33 controls operation of the power transmission unit 31 of the charging path 30.

Functional Configuration of Server

Figure 4:
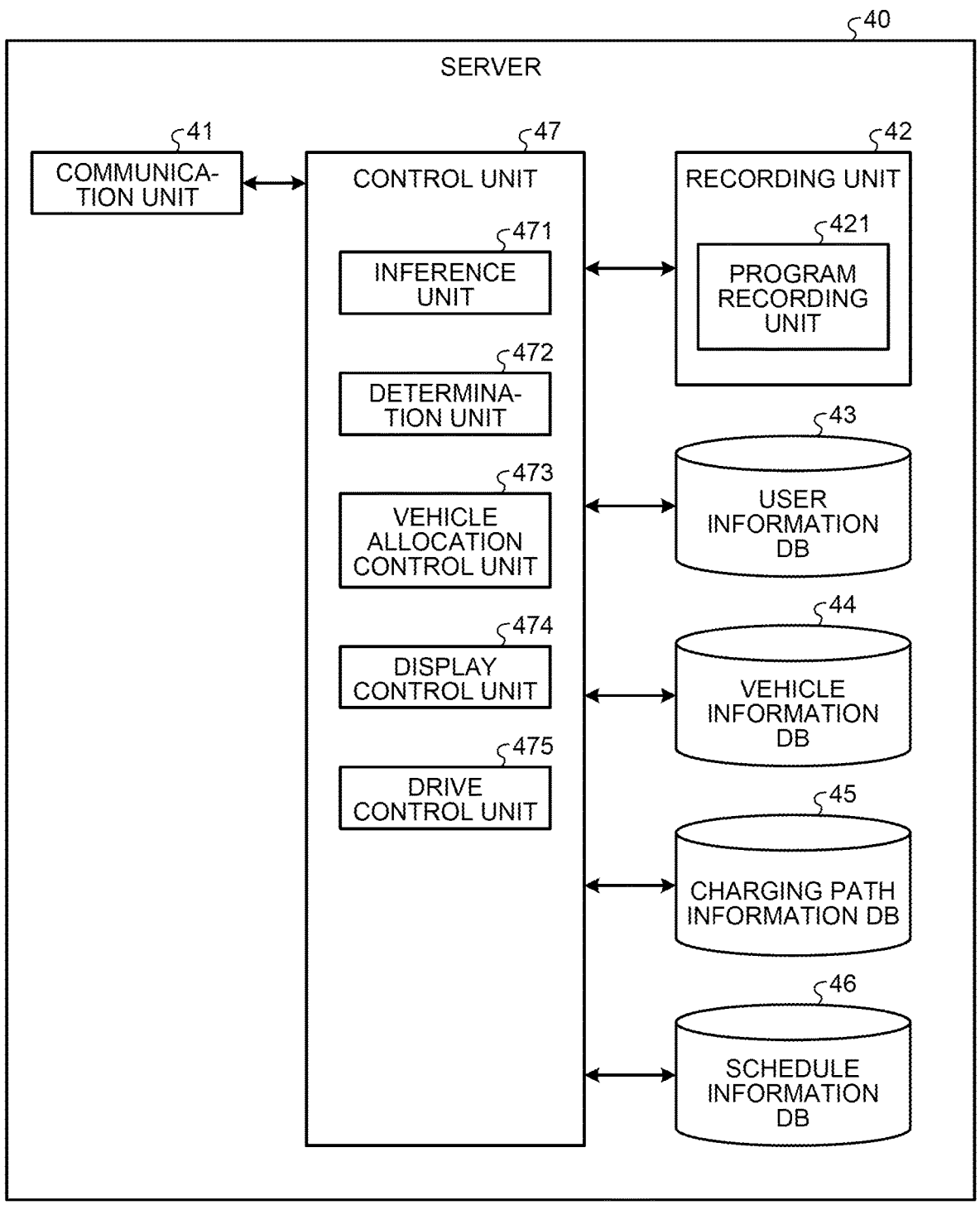
FIG. 4 is a block diagram illustrating a functional configuration of a server according to the first embodiment.

Next, a functional configuration of the server 40 will be described. FIG. 4 is a block diagram illustrating a functional configuration of the server 40.

The server 40 illustrated in FIG. 5 includes a communication unit 41, a recording unit 42, a user information database 43 (hereinafter referred to as "user information DB 43"), a vehicle information database 44 (hereinafter referred to as "vehicle information DB 44"), a charging path information database 45 (hereinafter referred to as "charging path information DB 45"), a schedule information database 46 (hereinafter referred to as "schedule information DB 46"), and a control unit 47.

The communication unit 41 communicates with the moving body 10, the communication terminal 20, and the charging path 30 over the network NW under control of the control unit 47 to receive and transmit various kinds of information. The communication unit 41 is, for example, a communication module.

The recording unit 42 records various kinds of information about the server 40. Further, the recording unit 42 has a program recording unit 421 that records various programs executed by the server 40. The recording unit 42 is realized by using a DRAM, a ROM, a flash memory, an SSD, an HDD, a memory card, or the like.

The user information DB 43 records user information in which terminal information for identifying the communication terminal 20 possessed by a user and user identification information for identifying the user are associated with each other. The terminal information includes a device address, a telephone number, an e-mail address, and the like. The user identification information includes a user's name, address, and date of birth and user's action history based on position information of the user's communication terminal 20. The action history may include user's purchase history based on electronic money registered in the user's communication terminal 20. The user information DB 43 is realized, for example, by an HDD or an SSD.

The vehicle information DB 44 records vehicle information in which vehicle identification information for identifying the moving body 10, current state information of the moving body 10, and current position information of the moving body 10 are associated with one another. The vehicle identification information includes vehicle model name, model year, owner, and the like of the moving body 10. The state information includes a remaining battery level of the battery 11, CAN data, and the like of the moving body 10. The vehicle information DB 44 is realized, for example, by an HDD or an SSD.

The charging path information DB 45 records charging path information in which an installation place of the charging path 30, the number of installed power transmission units 31, and a distance of the charging path 30 are associated with each other. The charging path information DB 45 is realized, for example, by an HDD or an SSD.

The schedule information DB 46 records schedule information of each of a plurality of users. The schedule information includes information on date and time of user's visit to a hospital. The schedule information DB 46 is realized, for example, by an HDD or an SSD.

The control unit 47 controls each unit of the server 40. The control unit 47 includes an inference unit 471, a determination unit 472, a vehicle allocation control unit 473, a display control unit 474, and a drive control unit 475. In the first embodiment, the control unit 47 functions as a processor.

The inference unit 471 acquires a current position of the moving body 10 used by a user, a remaining battery level of the battery 11 of the moving body 10 used by the user, and a user's first destination via the communication unit 41. Then, the inference unit 471 acquires an initial required power amount of the battery 11 of the moving body 10 based on the current position of the moving body 10 and the first destination. The initial required power amount is a power amount required when the moving body 10 travels from a user's planned use position to the first destination. Further, in a case where a second destination different from the first destination is input from the user's communication terminal 20 or the operation unit 164 of the car navigation system 16 of the moving body 10 via the communication unit 41, the inference unit 471 estimates a required power amount for travelling from the current position of the moving body 10 to the second destination based on the current position of the moving body 10 and the remaining battery level of the battery 11 of the moving body 10. The required power amount is a power amount required when the moving body 10 travels from the current position of the moving body 10 to the second destination. The inference unit 471 may read out a learned model recorded in the program recording unit 421, input, as input data, a user's destination (the first destination or the second destination), and the current position of the moving body 10 to the read learned model, and output an initial required power amount or a required power amount of the battery 11 as output data. This learned model is generated by using, for example, a deep neural network (DNN) as machine learning. The type of DNN network may be any type that can be used by the inference unit 471. Specifically, the type of machine learning is not limited in particular, for example, as long as teacher data and learning data in which a distance and a consumed power amount are associated are prepared and input to a calculation model based on a multi-layer neural network. Further, as a machine learning method, a method based on the DNN of a multi-layer neural network such as a convolutional neural network (CNN) or 3D-CNN may be used.

The determination unit 472 determines whether the remaining battery level of the battery 11 of the moving body 10 is equal to or greater than the initial required power amount estimated by the inference unit 471. Further, in a case where a second destination different from the first destination is input from the user's communication terminal 20 or the operation unit 164 of the car navigation system 16 of the moving body 10 via the communication unit 41, the determination unit 472 the determination unit 472 determines whether the current remaining battery level of the battery 11 of the moving body 10 is equal to or greater than the required power amount for travelling from the current position of the moving body 10 to the second destination estimated by the inference unit 471.

In a case where a new second destination different from the first destination is input by the user, the vehicle allocation control unit 473 sets, for the moving body 10, a charging travelling route passing the charging path 30 that can charge the battery 11 on the way from the current position to the second destination based on the remaining battery level of the battery 11 of the moving body 10. Specifically, in a case where the determination unit 472 determines that the remaining battery level of the battery 11 of the moving body 10 is equal to or greater than the required power amount, the vehicle allocation control unit 473 sets a normal travelling route from the current position to the second destination for the moving body 10 which the user is scheduled to use. Meanwhile, in a case where the determination unit 472 determines that the remaining battery level of the battery 11 of the moving body 10 is less than the required power amount, the vehicle allocation control unit 473 sets the charging travelling route for the moving body 10 which the user is scheduled to use. The normal travelling route is a shortest route from the current position of the moving body 10 to the second destination. In this case, the vehicle allocation control unit 473 sets the charging travelling route for the moving body 10 which the user is scheduled to use based on the charging path information recorded in the charging path information DB 45. Further, in a case where the remaining battery level of the battery 11 of the moving body 10 which the user is scheduled to use is equal to or greater than the initial required power amount, the vehicle allocation control unit 473 sets the initial travelling route from a planned use position toward the first destination for the moving body 10 which the user is scheduled to use. The initial travelling route is a shortest route from the user's planned use position to the first destination. Meanwhile, in a case where the remaining battery level of the battery 11 of the moving body 10 which the user is scheduled to use is less than the initial required power amount, the vehicle allocation control unit 473 sets, for the moving body 10 which the user is scheduled to use, an initial charging travelling route passing the charging path 30 that can charge the battery 11 on the way from the planned use position to the first destination. In this case, the vehicle allocation control unit 473 sets the initial charging travelling route for the moving body 10 which the user is scheduled to use based on the charging path information recorded in the charging path information DB 45. The initial charging travelling route is a route passing the charging path 30 on the way from the user's planned use position to the first destination. Further, in a case where the determination unit 472 determines that the battery 11 cannot be charged with the required power amount by travelling of the moving body 10 which the user is scheduled to use on the charging path 30, the vehicle allocation control unit 473 dispatches another moving body 10 having the required power amount to a place to which the moving body 10 which the user is scheduled to use can travel by using the remaining battery level of the battery 11.

The display control unit 474 outputs information indicating that the moving body 10 travels on the charging path 30 to the user.

The drive control unit 475 controls driving of the moving body 10 used by the user via the communication unit 41 and the network NW. Specifically, the drive control unit 475 moves the moving body 10 used by the user toward any one of the user's first destination and the user's second destination according to a route set by the vehicle allocation control unit 473 by controlling the moving body 10.

Processing of Server

Next, processing executed by the server 40 will be described. FIG. 5 is a flowchart illustrating an outline of processing executed by the server 40.

Figure 5:
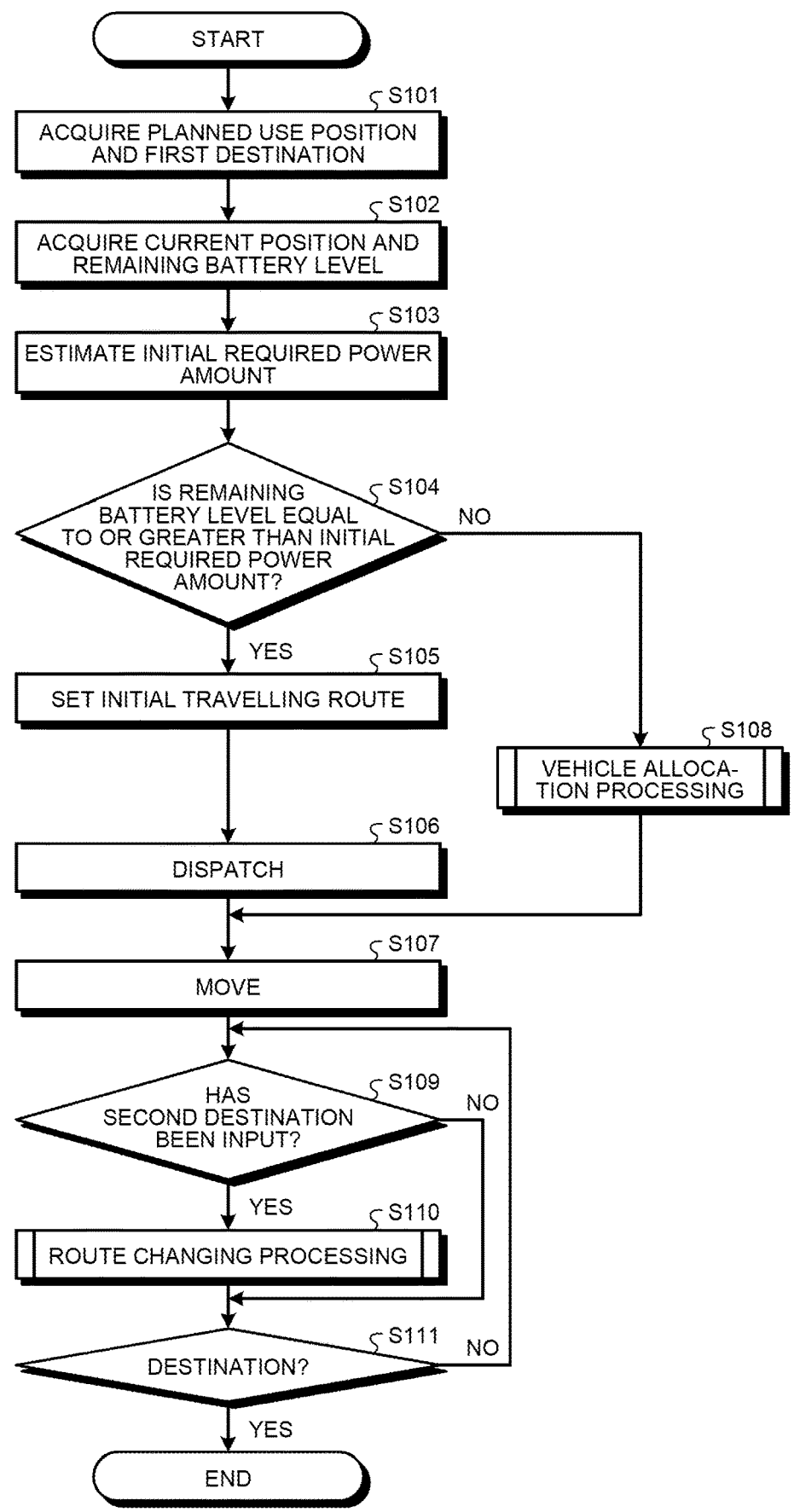
FIG. 5 is a flowchart illustrating an outline of processing executed by the server according to the first embodiment.

As illustrated in FIG. 5, first, the inference unit 471 acquires a user's planned use position and the first destination from the communication terminal 20 over the network NW (step S101). Specifically, the inference unit 471 acquires the planned use position of the moving body 10 and the first destination of the moving body 10 input by the user by using the communication terminal 20.

Subsequently, the inference unit 471 acquires the current position of the moving body 10 and the remaining battery level of the battery 11 from the moving body 10 which the user is scheduled to use over the network NW (step S102).

Then, the inference unit 471 estimates an initial required power amount of the battery 11 of the moving body 10 based on the user's planned use position, the user's first destination, and the remaining battery level of the battery 11 of the moving body 10 (step S103).

Subsequently, the determination unit 472 determines whether the remaining battery level of the battery 11 of the moving body 10 is equal to or greater than the initial required power amount estimated by the inference unit 471 (step S104). In a case where the determination unit 472 determines that the remaining battery level of the battery 11 of the moving body 10 is equal to or greater than the initial required power amount estimated by the inference unit 471 (step S104: Yes), the server 40 shifts to step S105, which will be described later. Meanwhile, in a case where the determination unit 472 determines that the remaining battery level of the battery 11 of the moving body 10 is less than the initial required power amount estimated by the inference unit 471 (step S104: No), the server 40 shifts to step S108, which will be described later.

In step S105, the vehicle allocation control unit 473 sets a first route from the user's planned use position to the first destination for the moving body 10 over the network NW. Specifically, the vehicle allocation control unit 473 sets an initial travelling route from the user's planned use position to the first destination in the car navigation system 16 of the moving body 10 over the network NW.

Subsequently, the vehicle allocation control unit 473 dispatches the moving body 10 to the user's planned use position by controlling the moving body 10 over the network NW (step S106). In this case, the vehicle allocation control unit 473 transmits an instruction signal including the user's planned use position and a user's use time to the moving body 10. The ECU 19 of the moving body 10 drives the driving unit 15 to move to the user's planned use position input from the server 40 according to the instruction signal input from the server 40.

Then, the drive control unit 475 moves the moving body 10 toward the first destination according to the route set in the car navigation system 16 after the user uses the moving body 10 at the planned use position (step S107). After step S107, the server 40 proceeds to step S109, which will be described later.

In step S108, the server 40 executes vehicle allocation processing for dispatching the moving body 10 having the initial required power amount or more to the user's planned use position. Details of the vehicle allocation processing will be described later. After step S108, the server 40 proceeds to step S109.

Subsequently, the determination unit 472 determines whether a second destination different from the first destination has been input by the user via the network NW and the communication terminal 20 or the operation unit 164 of the car navigation system 16 (step S109). In a case where the determination unit 472 determines that the second destination different from the first destination has been input by the user via the network NW and the communication terminal 20 or the operation unit 164 of the car navigation system 16 (step S109: Yes), the server 40 proceeds to step S110, which will be described later. Meanwhile, in a case where the determination unit 472 determines that the second destination different from the first destination has not been input by the user via the network NW and the communication terminal 20 or the operation unit 164 of the car navigation system 16 (step S109: No), the server 40 proceeds to step S111, which will be described later.

In step S110, the server 40 executes route changing processing for changing the route from the current position of the moving body 10 according to the second destination. Details of the route changing processing will be described later. After step S109, the server 40 proceeds to step S111.

In step S111, the determination unit 472 determines whether the moving body 10 has arrived at the destination. In this case, the determination unit 472 acquires position information of the moving body 10 at predetermined intervals, and determines whether the moving body 10 has arrived at the destination based on the acquired position information. In a case where the determination unit 472 determines that the moving body 10 has arrived at the destination (step S111: Yes), the server 40 finishes this processing. Meanwhile in a case where the determination unit 72 determines that the moving body 10 has not arrived at the destination (step S111: No), the server 40 returns to step S109.

Details of Vehicle Allocation Processing

Figure 6:
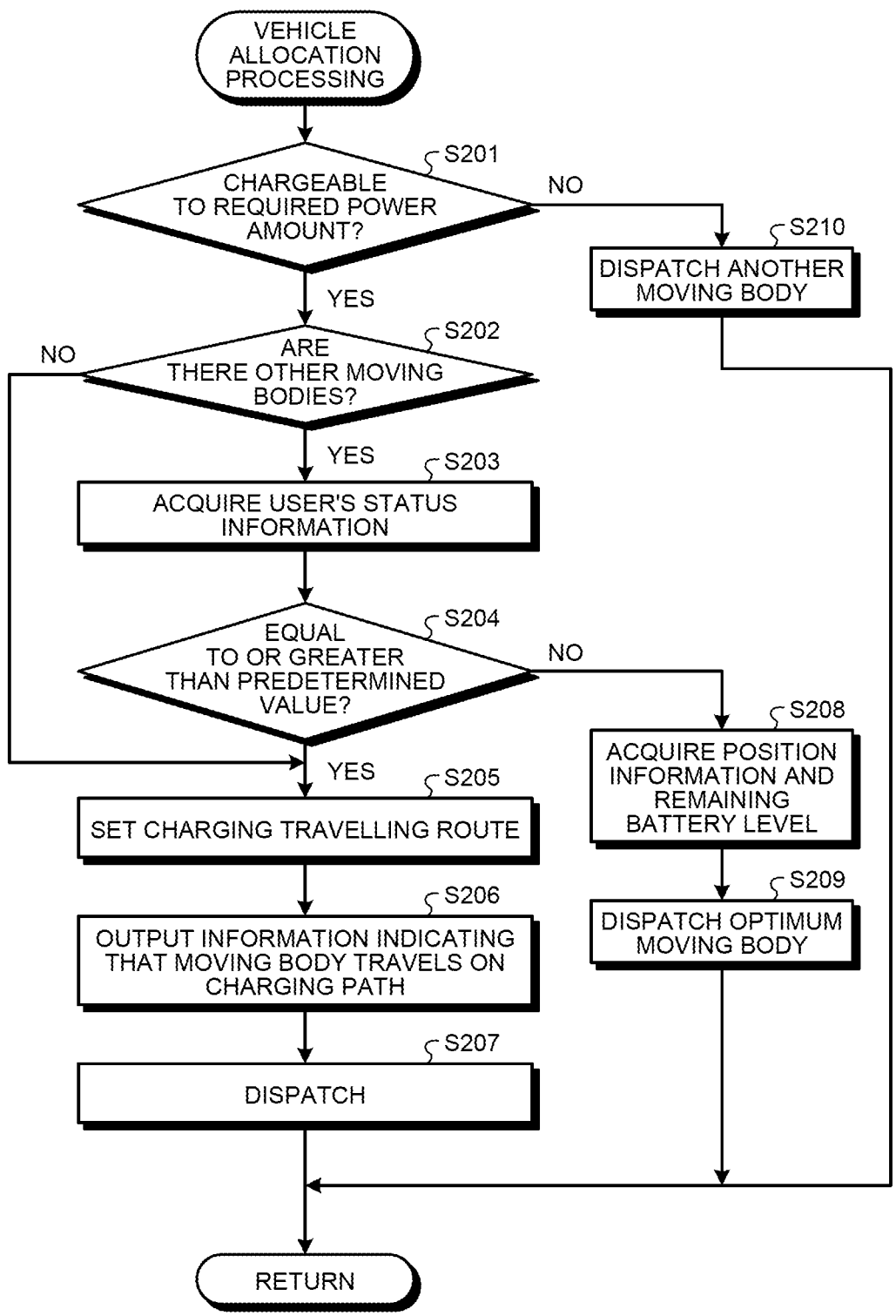
FIG. 6 is a flowchart illustrating an outline of vehicle allocation processing of FIG. 5.

Next, details of the vehicle allocation processing in step S108 of FIG. 5 will be described. FIG. 6 is a flowchart illustrating details of the vehicle allocation processing.

As illustrated in FIG. 6, first, the determination unit 472 determines whether the moving body 10 is chargeable to a required power amount from a current battery level of the battery 11 of the moving body 10 by travelling on the charging path 30 when moving toward the first destination (step S201). In a case where the determination unit 472 determines that the moving body 10 is chargeable to the required power amount from the current battery level of the battery 11 of the moving body 10 by travelling on the charging path 30 when moving toward the first destination (step S201: Yes), the server 40 proceeds to step S202, which will be described later. Meanwhile, in a case where the determination unit 472 determines that the moving body 10 is not chargeable to the required power amount from the current battery level of the battery 11 of the moving body 10 by travelling on the charging path 30 when moving toward the first destination (step S201: No), the server 40 proceeds to step S210, which will be described later.

In step S202, the determination unit 472 determines whether another moving body 10 is travelling on the charging path 30 based on the vehicle information recorded in the vehicle information DB 44, the user's planned use position, and the user's first destination. In this case, the determination unit 472 determines whether another moving body 10 is travelling on a route passing the charging path 30 among plural routes from the user's planned use position to the user's first destination based on position information of each moving body 10 included in the vehicle information recorded in the vehicle information DB 44 and the user's planned use position. For example, the determination unit 472 determines that another moving body 10 is travelling on the charging path 30 in a case where another moving body 10 is travelling on a route passing the charging path 30 among the plural routes from the user's planned use position to the user's first destination. In a case where the determination unit 472 determines that another moving body 10 is travelling on the charging path 30 (step S202: Yes), the server 40 proceeds to step S203, which will be described later. Meanwhile, in a case where the determination unit 472 determines that another moving body 10 is not travelling on the charging path 30 (step S202: No), the server 40 proceeds to step S205, which will be described later.

In step S203, the determination unit 472 acquires user's status information. Specifically, the determination unit 472 acquires the user status information included in the user information recorded in the user information DB 43. The user status information includes the presence or absence of a chronic disease, age, fever, heartbeat, complexion, sweating state, hospital visit history, and the like of the user. The determination unit 472 may acquire the user's status information from the user's communication terminal 20 over the network NW. In this case, the determination unit 472 acquires user's status information (for example, heartbeat) detected by a wearable device wirelessly connected to the user's communication terminal 20 and worn by the user via the user's communication terminal 20. Further, the determination unit 472 may acquire user's status information detected by a home device installed in a house in which the user is occupying, for example, a camera or a temperature sensor, over the network NW.

Subsequently, the determination unit 472 determines whether the user's status information is equal to or greater than a predetermined value (step S204). The predetermined value is set to "1" in a case where the presence or absence of a user's chronic disease is used as the user's status information. In this case, the determination unit 472 determines that the user's status information is equal to or greater than the predetermined value in a case where the user has a chronic disease, while determines that the user's status information is not less than the predetermined value in a case where the user has no chronic disease. Further, the predetermined value is set to 140 times in the case where a user's heart rate is used as the user's status information. In a case where the determination unit 472 determines that the user's status information is equal to or greater than the predetermined value (step S204: Yes), the server 40 proceeds to step S205, which will be described later. Meanwhile, in a case where the determination unit 472 determines that the user's status information is less than the predetermined value (step S204: No), the server 40 proceeds to step S208, which will be described later.

In step S205, the vehicle allocation control unit 473 sets, in the moving body 10, a charging travelling route passing the charging path 30 from the user's planned use position to the first destination over the network NW. Specifically, the vehicle allocation control unit 473 sets the charging travelling route in the car navigation system 16 of the moving body 10 over the network NW.

Figure 7:
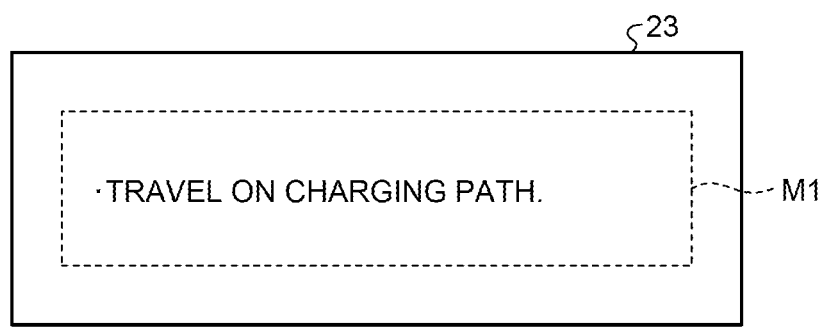
FIG. 7 is a diagram illustrating an example of an image displayed by the communication terminal according to the first embodiment.

Subsequently, the display control unit 474 outputs information indicating that the moving body 10 travels on the charging path 30 to the user's communication terminal 20 over the network NW (step S206). In this case, as illustrated in FIG. 7, the display unit 23 of the communication terminal 20 displays a message M1 corresponding to the information received from the server 40 indicating that the moving body 10 travels on the charging path 30. This allows the user to know that the moving body 10 travels on the charging path 30.

Subsequently, the vehicle allocation control unit 473 dispatches the moving body 10 to the user's planned use position by controlling the moving body 10 over the network NW (step S207). In this case, the vehicle allocation control unit 473 transmits an instruction signal including the user's planned use position and a user's use time to the moving body 10. The ECU 19 of the moving body 10 drives the driving unit 15 to move to the user's planned use position input from the server 40 according to the instruction signal input from the server 40. After step S207, the server 40 returns to the main routine of FIG. 5 and proceeds to step S107.

In step S208, the vehicle allocation control unit 473 acquires position information of each of the other plurality of moving bodies 10 and a remaining battery level of the battery 11 of each of the other plurality of moving bodies 10. Specifically, the vehicle allocation control unit 473 acquires the position information of each of the other plurality of moving bodies 10 and the remaining battery level of the battery 11 of each of the other plurality of moving bodies 10 from the vehicle information DB 44.

Subsequently, the vehicle allocation control unit 473 dispatches an optimum moving body 10 to the user's planned use position based on the position information indicating the current position of each of the other plurality of moving bodies 10 and the remaining battery level of the battery 11 of each of the other plurality of moving bodies 10 (step S209). This allows the user to move toward the first destination by the shortest route without the need to switch to another moving body 10. After step S209, the server 40 returns to the main routine of FIG. 5 and proceeds to step S107.

In step S210, the vehicle allocation control unit 473 dispatches another moving body 10 having the required power amount to a place to which the moving body 10 which the user is scheduled to use can travel with the remaining battery level of the battery 11 or to the user's planned use position. In this case, the vehicle allocation control unit 473 dispatches another moving body 10 having the required power amount to a place to which the moving body 10 which the user is scheduled to use can travel with the remaining battery level of the battery 11 or to the user's planned use position based on the vehicle information recorded in the vehicle information DB 44. As a result, even if the battery 11 of the moving body 10 used by the user runs out of power, the user can move to the desired destination without delay by switching to another moving body 10. After step S210, the server 40 returns to the main routine of FIG. 5 and proceeds to step S107.

Details of Route Changing Processing

Figure 8:
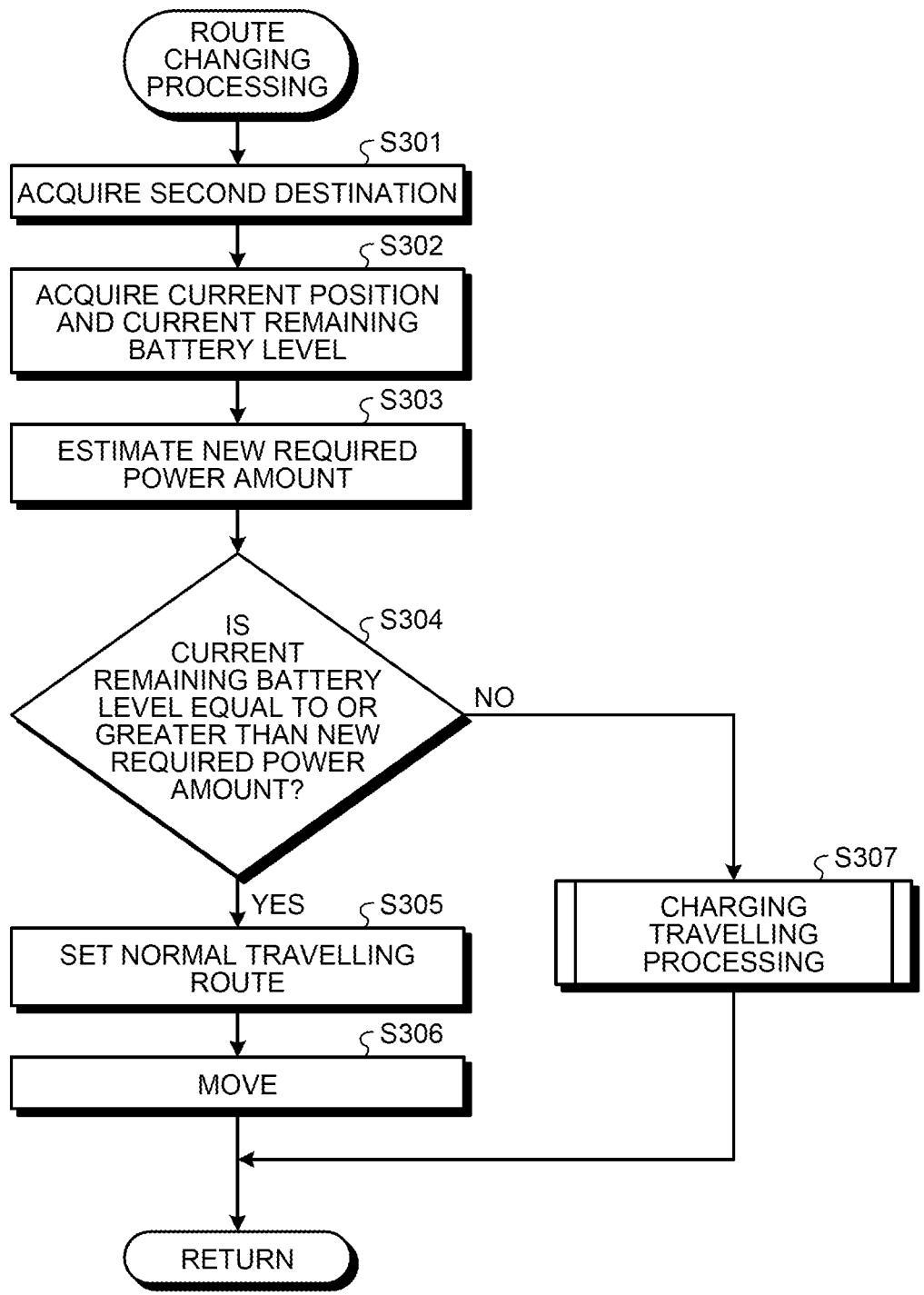
FIG. 8 is a flowchart illustrating an outline of route changing processing of FIG. 5.

Next, details of the route changing processing described in step S110 of FIG. 5 will be described. FIG. 8 is a flowchart illustrating details of the route changing processing.

As illustrated in FIG. 8, the inference unit 471 acquires the second destination input by the user by operating the operation unit 24 of the communication terminal 20 over the network NW (step S301).

The inference unit 471 acquires the current position of the moving body 10 and the current remaining battery level of the battery 11 of the moving body 10 over the network NW (step S302).

Subsequently, the inference unit 471 estimates new required power of the moving body 10 based on the current position of the moving body 10 and the second destination (step S303).

Then, the determination unit 472 determines whether the current remaining battery level of the battery 11 of the moving body 10 is equal to or greater than the new required power amount (step S304). In a case where the determination unit 472 determines that the current remaining battery level of the battery 11 of the moving body 10 is equal to or greater than the new required power amount (step S304: Yes), the server 40 proceeds to step S305, which will be described later. Meanwhile, in a case where the determination unit 472 determines that the current remaining battery level of the battery 11 of the moving body 10 is less than the new required power amount (step S304: No), the server 40 proceeds to step S307, which will be described later.

In step S305, the vehicle allocation control unit 473 sets a normal travelling route indicating a travelling path from the current position of the moving body 10 to the second destination in the moving body 10 over the network NW. Specifically, the vehicle allocation control unit 473 sets a normal travelling route indicating a travelling path from the current position of the moving body 10 to the second destination in the car navigation system 16 of the moving body 10 over the network NW.

Subsequently, the drive control unit 475 moves the moving body 10 according to the route set in the car navigation system 16 by controlling the moving body 10 over the network NW (step S306). After step S306, the server 40 returns to the main routine of FIG. 5 and proceeds to step S111.

In step S307, the server 40 performs charging travelling processing for causing the moving body 10 to travel on the charging path 30 that is a travelling path from the current position of the moving body 10 to the second destination over the network NW. Details of the charging travelling processing will be described later. After step S307, the server 40 returns to the main routine of FIG. 5 and proceeds to step S111.

Details of Charging Travelling Processing

Figure 9:
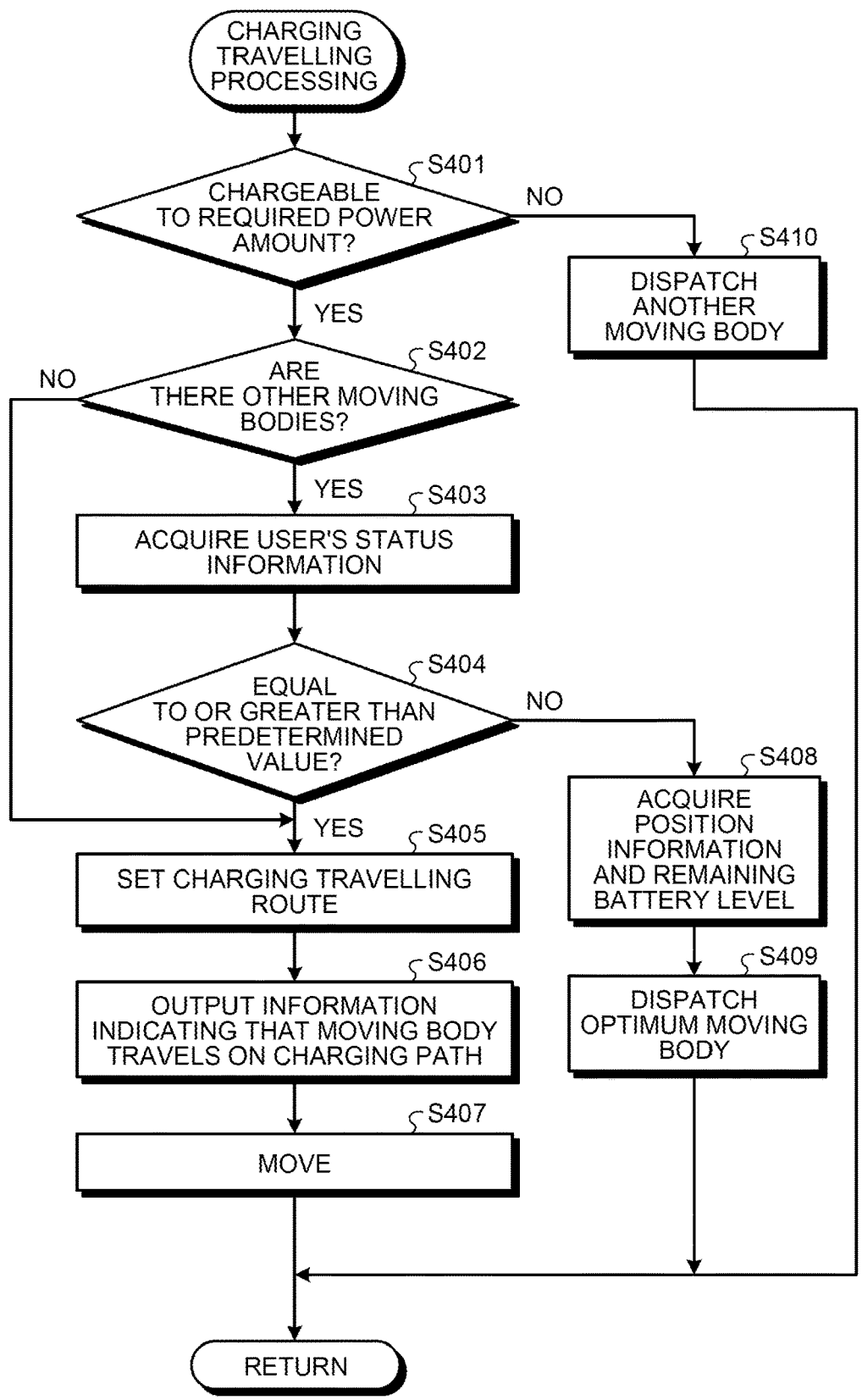
FIG. 9 is a flowchart illustrating an outline of charging travelling processing of FIG. 8.

Next, details of the charging travelling processing described in step S307 of FIG. 8 will be described. FIG. 9 is a flowchart illustrating the details of the charging travelling processing. In FIG. 8, steps other than step S407, specifically, steps S401 to S406 and steps S408 to S410 are similar to steps S201 to S206 and steps S208 to S210 in FIG. 6, respectively, and therefore detailed description thereof will be omitted.

In step S407, the drive control unit 475 moves the moving body 10 toward the destination according to the route set in the car navigation system 16 by controlling the moving body 10 over the network NW. After step S407, the server 40 returns to the subroutine of FIG. 8 and returns to the main routine of FIG. 5.

According to the first embodiment described above, the inference unit 471 acquires a current position of the moving body 10 used by a user, a remaining battery level of the rechargeable battery 11 of the moving body 10 used by the user, and a user's first destination. In a case where a new second destination different from the first destination is input, the vehicle allocation control unit 473 sets, for the moving body 10, a charging travelling route passing the charging path 30 that can charge the battery 11 on the way from the current position of the moving body 10 to the second destination based on the remaining battery level of the battery 11 of the moving body 10. As a result, even if the user's destination is changed, it is possible to respond according to the new destination.

Further, according to the first embodiment, in a case where a new second destination different from the first destination is input, the inference unit 471 estimates a required power amount for travelling from the current position of the moving body 10 to the second destination based on the current position of the moving body 10 and the remaining battery level of the battery 11 of the moving body 10. Then, the determination unit 472 determines whether the remaining battery level of the battery 11 is equal to or greater than the required power amount estimated by the inference unit 471. Subsequently, in a case where the determination unit 472 determines that the remaining battery level is equal to or greater than the required power amount, the vehicle allocation control unit 473 sets a normal travelling route from the current position to the second destination for the moving body 10. Meanwhile, in a case where the determination unit 472 determines that the remaining battery level is less than the required power amount, the vehicle allocation control unit 473 sets a charging travelling route for the moving body 10. As a result, even if the user's destination is changed while the user is using the moving body 10, the user can move to the changed destination without switching the moving body 10 to another moving body 10.

Further, according to the first embodiment, the inference unit 471 acquires the user's planned use position, the user's first destination, and the remaining battery level of the battery 11. Then, the inference unit 471 estimates an initial required power amount of the battery based on the user's planned use position and the first destination. Subsequently, the determination unit 472 determines whether the remaining battery level of the battery 11 of the moving body 10 is equal to or greater than the initial required power amount. Then, in a case where the determination unit 472 determines that the remaining battery level of the battery 11 of the moving body 10 is equal to or greater than the initial required power amount estimated by the inference unit 471, the vehicle allocation control unit 473 sets an initial travelling route from the planned use position to the first destination for the moving body 10. Meanwhile, in a case where the determination unit 472 determines that the remaining battery level of the battery 11 of the moving body 10 is less than the initial required power amount estimated by the inference unit 471, the vehicle allocation control unit 473 sets, for the moving body 10, an initial charging travelling route (charging travelling path) passing the charging path 30 capable of charging the battery 11 on the way from the planned use position to the first destination. As a result, the user can move to the desired destination by using the moving body 10 used at the planned use position without switching to another moving body 10.

Further, according to the first embodiment, the determination unit 472 determines whether the moving body 10 is chargeable to the required power amount by travelling on the charging path 30. Then, in a case where the determination unit 472 determines that the moving body 10 is chargeable to the required power amount, the vehicle allocation control unit 473 causes the moving body 10 to travel on the charging travelling route. Meanwhile, in a case where the determination unit 472 determines that the moving body 10 is not chargeable to the required power amount, the vehicle allocation control unit 473 dispatches another moving body 10 to a place to which the moving body 10 used by the user can travel with the remaining battery level of the battery 11 of the moving body 10. As a result, the user can move to the desired destination while minimizing the number of switches.

Further, according to the first embodiment, the determination unit 472 determines whether status information regarding a user's status is equal to or greater than a predetermined value. In a case where the determination unit 472 determines that the user's status information is equal to or greater than the predetermined value, if a plurality of other moving bodies 10 are travelling on the charging path 30, the vehicle allocation control unit 473 causes the moving body 10 used by the user to travel preferentially over the plurality of other moving bodies 10. As a result, even in a case where a plurality of other moving bodies 10 are travelling, the moving body 10 used by the user can preferentially travel on the charging path 30, so that the user whose condition is not good can move to a desired destination without switching to another moving body 10.

Further, according to the first embodiment, the display control unit 474 outputs information indicating that the moving body 10 used by the user travels on the charging path 30 to the user's communication terminal 20. This allows the user to know that the moving body 10 travels on the charging path 30.

Second Embodiment

Next, the second embodiment will be described. In the second embodiment, a user's behavior is predicted based on user's behavior history, and a route of a travelling path on which a moving body travels is changed based on the prediction result. In the following, constituent elements identical to those of the charging system 1 according to the first embodiment are given identical reference signs, and detailed description thereof will be omitted.

Overview of Charging System

Figure 10:
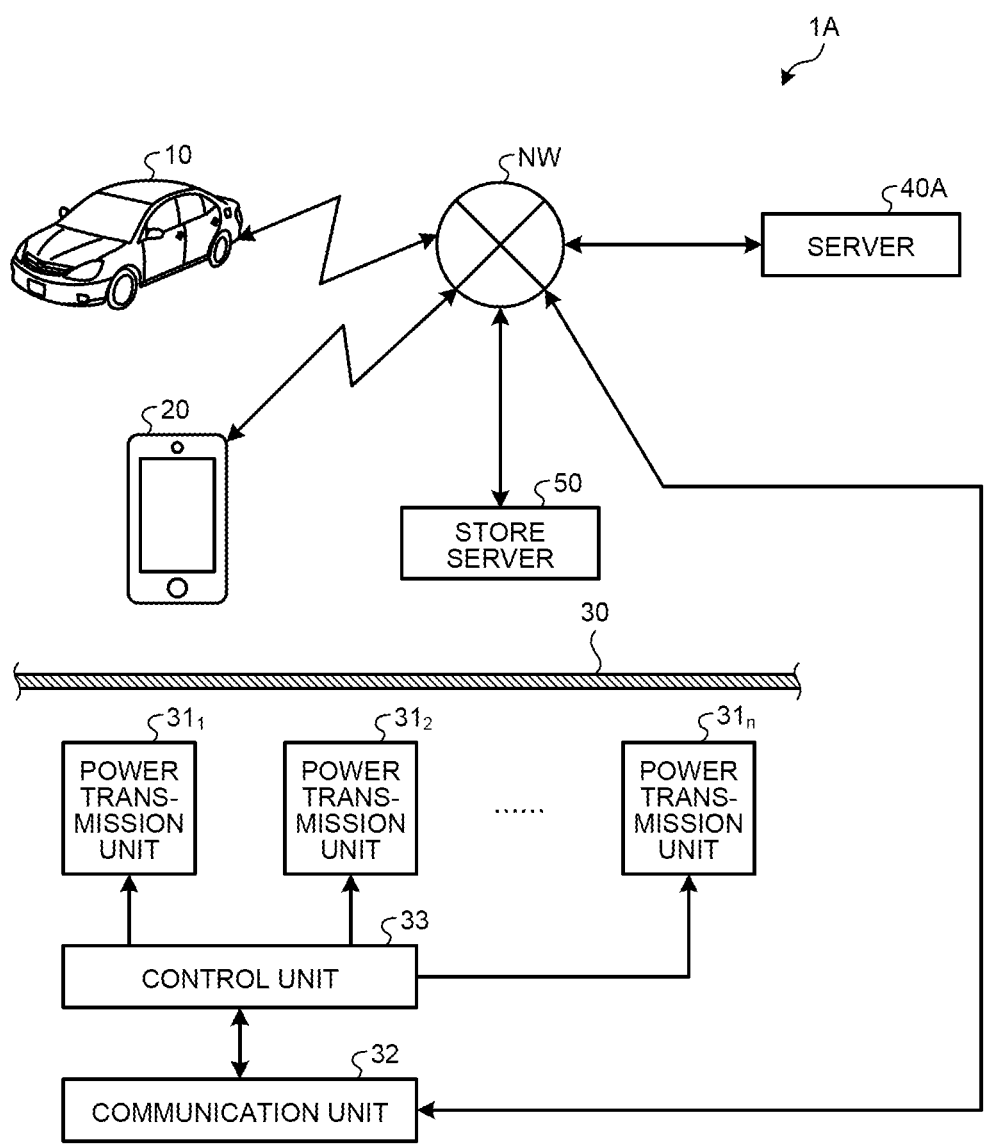
FIG. 10 is a diagram schematically illustrating a configuration of a charging system according to a second embodiment.

FIG. 10 is a diagram schematically illustrating a configuration of a charging system according to the second embodiment. A charging system 1A illustrated in FIG. 10 includes a server 40A instead of the server 40 according to the first embodiment. Further, the charging system 1A includes a store server 50.

Functional Configuration of Server

Figure 11:
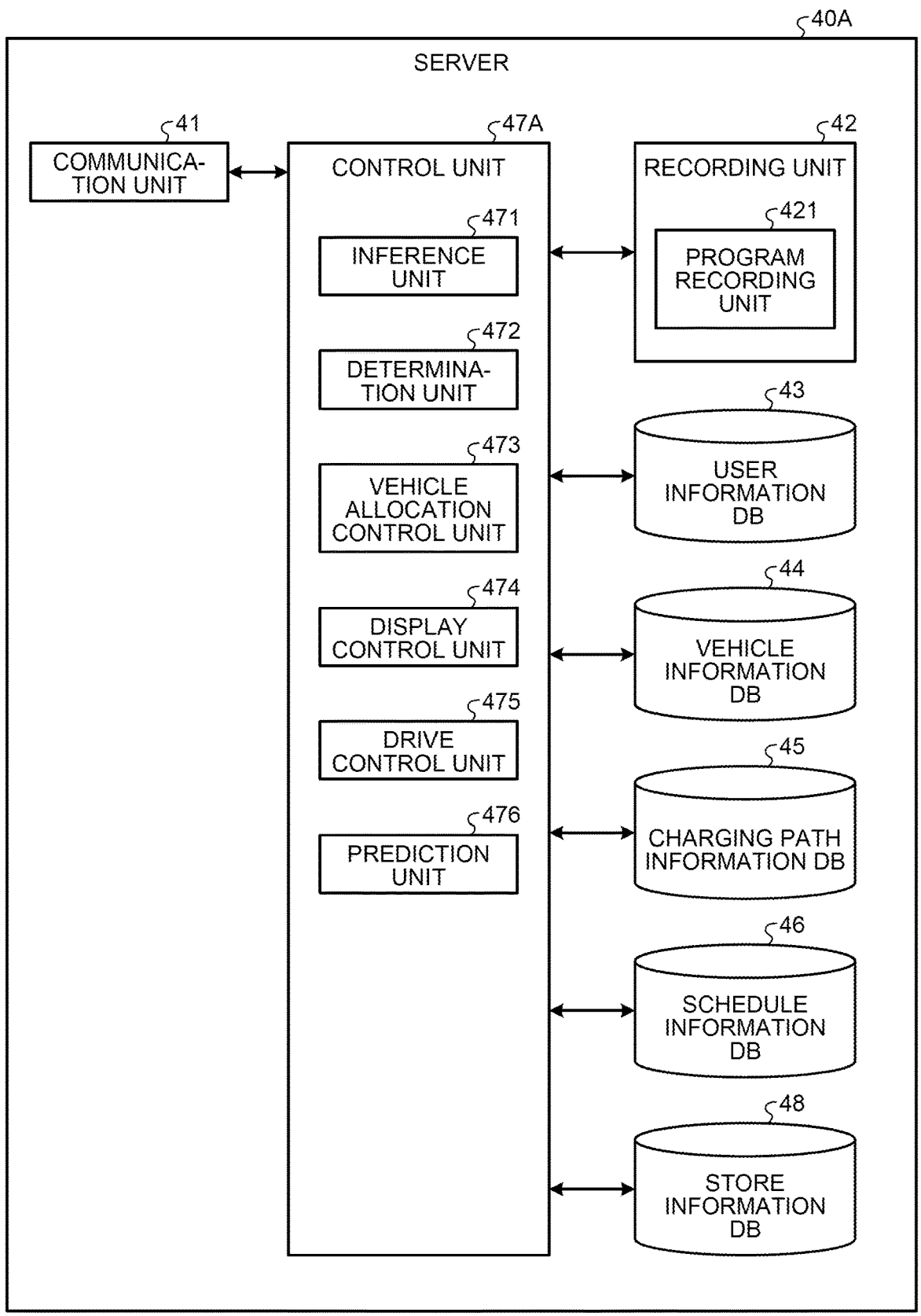
FIG. 11 is a block diagram illustrating a functional configuration of a server according to the second embodiment.

First, a functional configuration of the server 40A will be described. FIG. 11 is a block diagram illustrating a functional configuration of the server 40A. The server 40A illustrated in FIG. 11 includes a store information database 48 (hereinafter referred to as "store information DB 48") in addition to the configuration of the server 40 according to the first embodiment. Further, the server 40A includes a control unit 47A instead of the control unit 47 according to the first embodiment.

The store information DB 48 records store information in which position information of each of a plurality of stores and a type of business of the store are associated with each other. The store information DB 48 is realized, for example, by an HDD or an SSD.

The control unit 47A is constituted by a memory and a processor having hardware such as a CPU, an FPGA, and a GPU. The control unit 47A further includes a prediction unit 476 in addition to the functions of the control unit 47 according to the first embodiment.

The prediction unit 476 predicts a user's behavior based on a user's purchase history, a user's behavior history, and inventory information of a first destination. Specifically, the prediction unit 476 acquires the user's purchase history and behavior history from a user information DB 43, and acquires the inventory information of the store which is the user's first destination from the store server 50 over the network NW. Then, the prediction unit 476 predicts a user's behavior based on the user's purchase history, the user's behavior history, and the inventory information of the first destination.

Functional Configuration of Store Server

Figure 12:
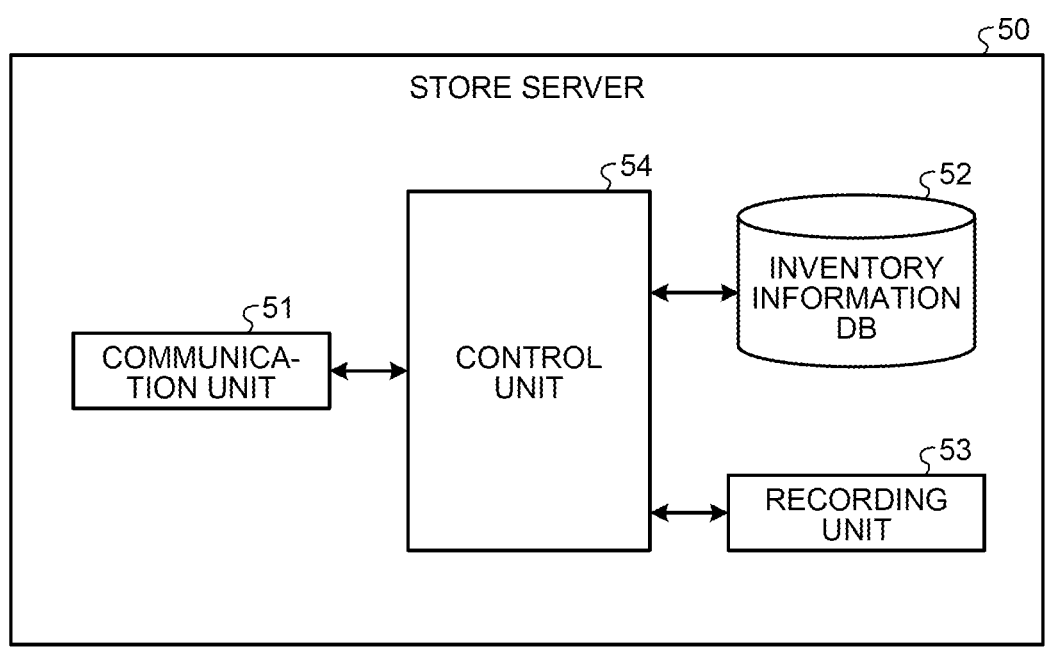
FIG. 12 is a block diagram illustrating a functional configuration of a store server according to the second embodiment.

Next, a functional configuration of the store server 50 will be described. FIG. 12 is a block diagram illustrating a functional configuration of the store server 50. The store server 50 illustrated in FIG. 12 includes a communication unit 51, an inventory information database 52 (hereinafter referred to as "inventory information DB 52"), a recording unit 53, and a control unit 54.

The communication unit 51 transmits and receives various kinds of information through communication with the server 40A over the network NW under control of the control unit 54. The communication unit 51 is, for example, a communication module.

The inventory information DB 52 records inventory information in which a plurality of products owned by each of a plurality of stores and the inventory of each of the plurality of products are associated with each other. The inventory information DB 52 is realized, for example, by an HDD or an SSD.

The recording unit 53 records various information about the store server 50 and various programs executed by the store server 50. The recording unit 53 is realized by using a DRAM, a ROM, a flash memory, an SSD, an HDD, a memory card, or the like.

The control unit 54 is constituted by a memory and a processor having hardware such as a CPU, a field-programmable gate array (FPGA), and a GPU. The control unit 54 controls each unit of the store server 50.

Processing of Server

Figure 13:
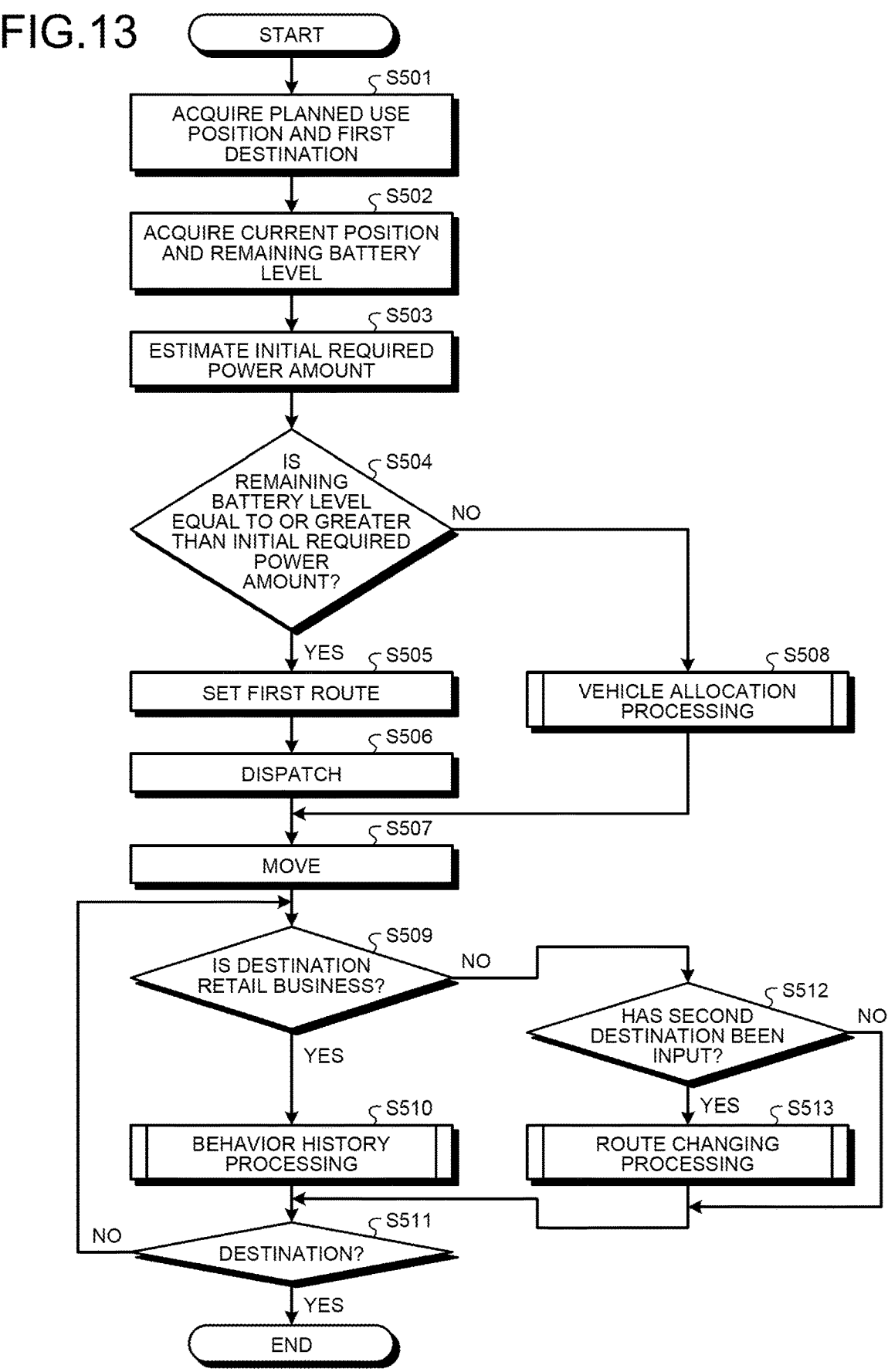
FIG. 13 is a flowchart illustrating an outline of processing executed by the server according to the second embodiment.

Next, processing executed by the server 40A will be described. FIG. 13 is a flowchart illustrating an outline of the processing executed by the server 40A. In FIG. 13, steps S501 to S508 correspond to steps S101 to S108 described in FIG. 5 of the first embodiment, respectively.

In step S509, a determination unit 472 determines whether a destination of a moving body 10 is a retail business. In a case where the determination unit 472 determines that the destination of the moving body 10 is a retail business (step S509: Yes), the server 40A proceeds to step S510, which will be described later. Meanwhile, in a case where the determination unit 472 determines that the destination of the moving body 10 is not a retail business (step S509: No), the server 40A proceeds to step S512, which will be described later.

In step S510, the server 40A executes behavior history processing for changing a route on which the moving body 10 travels according to the user's behavior history. Details of the behavior history processing will be described later.

Subsequently, the determination unit 472 determines whether the moving body 10 has arrived at the destination (step S511). In this case, the determination unit 472 acquires position information of the moving body 10 at predetermined intervals, and determines whether the moving body 10 has arrived at the destination based on the acquired position information. In a case where the determination unit 472 determines that the moving body 10 has arrived at the destination (step S511: Yes), the server 40A finishes this processing. Meanwhile, in a case where the determination unit 72 determines that the moving body 10 has not arrived at the destination (step S511: No), the server 40A returns to step S509.

Step S512 and step S513 correspond to step S109 and step S110 in FIG. 5, respectively. After step S513, the server 40A proceeds to step S511.

Details of Behavior History Processing

Figure 14:
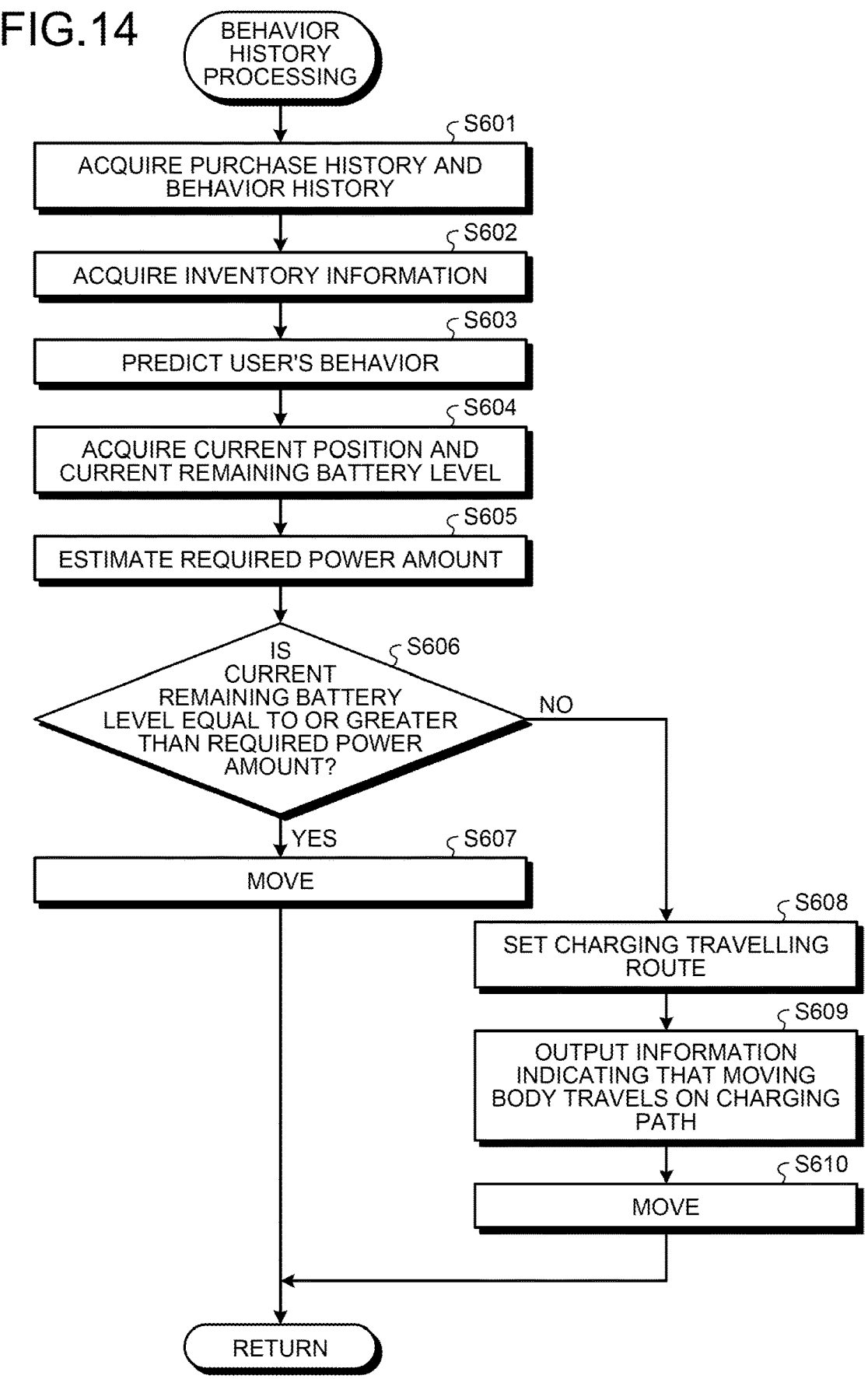
FIG. 14 is a flowchart illustrating an outline of behavior history processing of FIG. 13.

Next, details of the behavior history processing in step S510 of FIG. 13 will be described. FIG. 14 is a flowchart illustrating the details of the behavior history processing.

As illustrated in FIG. 14, first, the prediction unit 476 acquires the user's purchase history and behavior history associated with a device address of the user's communication terminal 20 from a behavior history information DB (step S601).

Subsequently, the prediction unit 476 acquires the inventory information of the retail store which is the destination from the store information recorded in the inventory information DB 52 of the store server 50 over the network NW (step S602).

Then, the prediction unit 476 predicts a user's behavior based on the user's purchase information, the behavior history, and the inventory information of the retail store (step S603). In this case, if a desired product is not available at the retail store that is the destination, the user may move to a retail store in which the desired product is in stock. Therefore, the prediction unit 476 determines whether there is a product desired by the user at the destination based on the user's purchase information and the inventory information of the retail store, and in a case where the product desired by the user is not available, predicts a retail store where the user can purchase the desired product as a new destination based on the user's behavior history.

Subsequently, the inference unit 471 acquires a current position of the moving body 10 and a current remaining battery level of the battery 11 over the network NW (step S604).

Then, the inference unit 471 estimates a new required power amount of the moving body 10 based on the current position of the moving body 10 and the new destination (predicted destination) (step S605).

Subsequently, the determination unit 472 determines whether the current remaining battery level of the battery 11 of the moving body 10 is equal to or greater than the new required power amount (step S606). In a case where the determination unit 472 determines that the current remaining battery level of the battery 11 of the moving body 10 is equal to or greater than the new required power amount (step S606: Yes), the server 40A proceeds to step S607, which will be described later. Meanwhile, in a case where the determination unit 472 determines that the current remaining battery level of the battery 11 of the moving body 10 is less than the new required power amount (step S606: No), the server 40A proceeds to step S608, which will be described later.

In step S607, a drive control unit 475 moves the moving body 10 according to a route set in a car navigation system 16 by controlling the moving body 10 over the network NW. After step S607, the server 40A returns to the main routine of FIG. 13 and proceeds to step S511.

In step S608, a vehicle allocation control unit 473 sets, for the moving body 10, a travelling path passing a charging path 30 that is a travelling path from the current position of the moving body 10 to the destination as a new route in the car navigation system 16 of the moving body 10 over the network NW. As a result, in a case where the desired product is not in stock at the destination, the user can move to the new destination by the moving body 10 since the remaining battery level of the battery 11 of the moving body 10 satisfies the required power amount.

Subsequently, a display control unit 474 outputs information indicating that the moving body 10 travels on the charging path 30 to the user's communication terminal 20 over the network NW (step S609). In this case, the display unit 23 of the communication terminal 20 displays a message M1 corresponding to the information received from the server 40 indicating that the moving body 10 travels on the charging path 30, as in FIG. 7. In this case, the display control unit 474 may output information indicating that the product desired by the user is out of stock at the user's destination to the user's communication terminal 20. This allows the user to know that the moving body 10 travels on the charging path 30.

Then, the drive control unit 475 moves the moving body 10 according to the route set in the car navigation system 16 by controlling the moving body 10 over the network NW (step S610). After step S610, the server 40A returns to the main routine of FIG. 13 and proceeds to step S511.

According to the second embodiment described above, the determination unit 472 determines whether a business type of the user's first destination is a retail business. In a case where the determination unit 472 determines that the user's first destination is a retail business, the prediction unit 476 acquires the user's purchase history, the user's behavior history, and the inventory information of the first destination. Then, the prediction unit 476 predicts a user's behavior based on the user's purchase history, the user's behavior history, and the inventory information of the first destination. Subsequently, the inference unit 471 estimates a new required power amount of the moving body 10 based on the behavior predicted by the prediction unit 476. Then, in a case where the determination unit 472 determines that the remaining battery level of the battery 11 of the moving body 10 does not satisfy the new required power amount, the vehicle allocation control unit 473 sets, for the moving body 10, an initial charging travelling route passing the charging path 30 that can charge the battery 11 on the way from a planned use position to the first destination. As a result, in a case where the product desired by the user is not available, the user can move to the new destination without switching to another moving body 10 since the required power amount for travelling to the next destination is predicted.

Third Embodiment

Next, the third embodiment will be described. Although the server sets a route from a user's planned use position to a destination in a moving body according to a remaining battery level in the first and second embodiments, an ECU of the moving body sets the route from the user's planned use position to the destination according to the remaining battery level in the third embodiment. A moving body according to the third embodiment will be described below.

Functional Configuration of Moving Body

Figure 15:
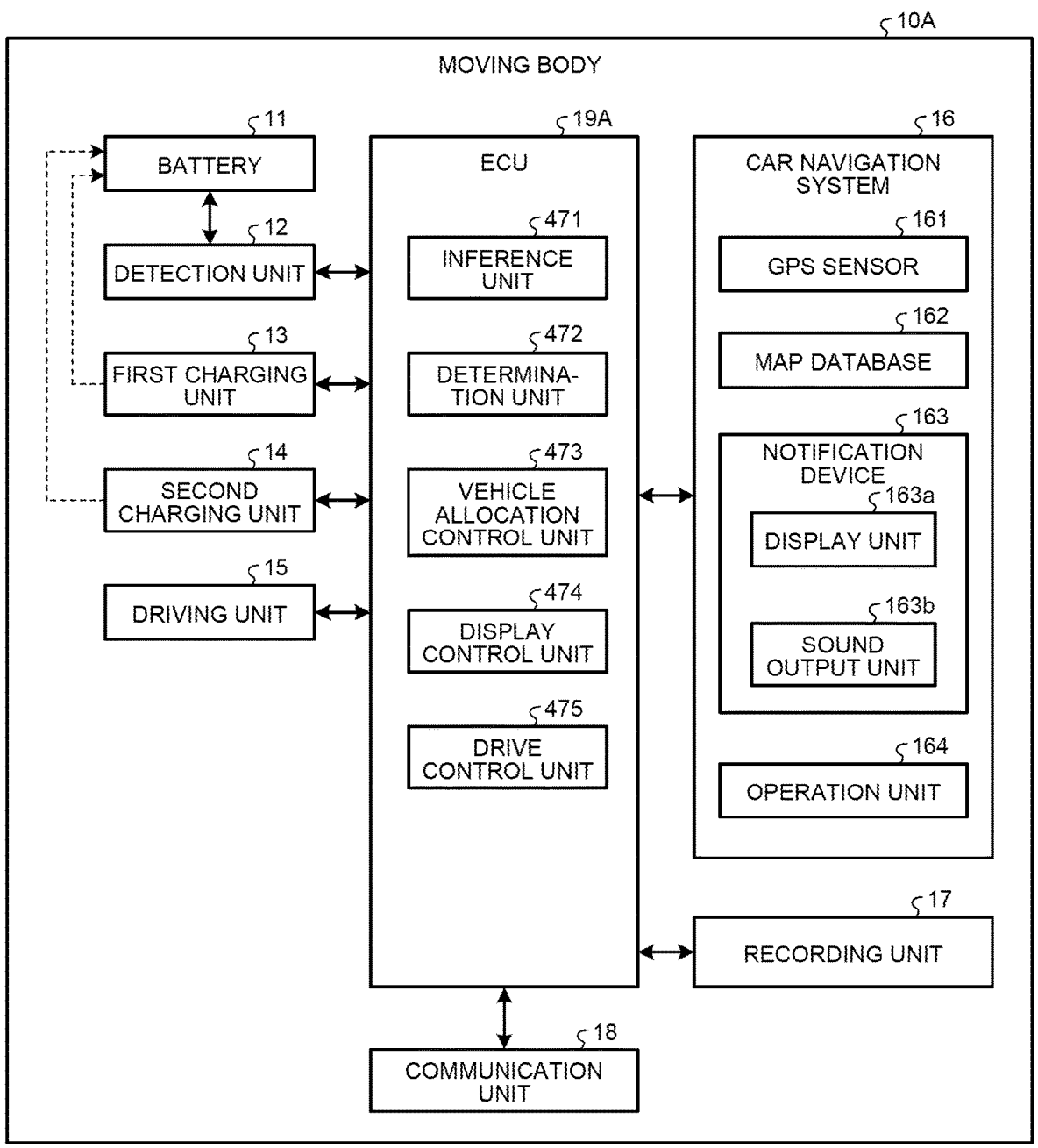
FIG. 15 is a block diagram illustrating a functional configuration of a moving body according to a third embodiment.

FIG. 15 is a block diagram illustrating a functional configuration of the moving body according to the third embodiment. A moving body 10A illustrated in FIG. 15 includes an ECU 19A instead of the ECU 19 of the moving body 10 according to the first embodiment. The ECU 19A includes the inference unit 471, the determination unit 472, the vehicle allocation control unit 473, the display control unit 474, and the drive control unit 475 of the control unit 47 of the server 40 according to the first embodiment.

The moving body 10A configured in this way performs similar processing to the server 40 of the first embodiment. Specifically, the inference unit 471 of the moving body 10A acquires a current position of the moving body 10A used by a user, a remaining battery level of a rechargeable battery 11 of the moving body 10A used by the user, and a user's first destination through communication with a user's communication terminal 20 over a network NW. In a case where a new second destination different from the first destination is input, the vehicle allocation control unit 473 sets, for the moving body 10A, a charging travelling route passing a charging path 30 that can charge the battery 11 on the way from the current position of the moving body 10A to the second destination based on the remaining battery level of the battery 11 of the moving body 10A. As a result, even if the user's destination is changed, it is possible to respond according to the new destination.

According to the third embodiment described above, even if a user's destination is changed, it is possible to respond according to a new destination, as in the first embodiment.

Other Embodiments

Further, in the charging systems according to the first to third embodiments, "unit" can be read as "circuit" or the like. For example, the control unit can be read as a control circuit.

The program to be executed by the charging systems according to the first to third embodiments is offered as a file data in an installable format or an executable format by being recorded in a computer-readable recording medium such as a CD-ROM, a flexible disc (FD), a CD-R, a digital versatile disk (DVD), a USB medium, or a flash memory.

Further, the program to be executed by the charging systems according to the first to third embodiments may be offered by being stored in a computer connected to a network such as the Internet and downloaded over a network.

In the description of the flowcharts in the present specification, the order of processes in steps has been explained by using expressions such as "first", "then", and "subsequently", but the order of processes necessary for implementing the present embodiment is not uniquely defined by these expressions. That is, the order of processes in the flowchart described in the present specification can be changed unless inconsistency occurs.

According to an embodiment, it is possible to obtain an effect of responding to a new destination even in a case where a user's destination is changed.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A server comprising a processor configured to acquire a current position of a moving body used by a user, a remaining battery level of a rechargeable battery of the moving body used by the user, and
   a first destination of the user, and in a case where a new second destination different from the first destination is input, set, for the moving body, a charging travelling route passing a charging path capable of charging the battery on a way from the current position to the second destination based on the remaining battery level,
   the processor being further configured to:
   acquire a planned use position of the user, the first destination of the user, and the remaining battery level,
   estimate an initial required power amount of the battery based on the planned use position and the first destination,
   determine whether the remaining battery level is equal to or greater than the initial required power amount,
   in a case where the remaining battery level is equal to or greater than the initial required power amount, set, for the moving body, an initial travelling route from the planned use position to the first destination, and
   in a case where the remaining battery level is less than the initial required power amount, set, for the moving body, an initial charging travelling route passing a charging path capable of charging the battery on a way from the planned use position to the first destination,
   determine whether a business type of the first destination is a retail business, in a case where the first destination is a retail business, acquire a purchase history of the user, a behavior history of the user, and inventory information of the first destination,
   predict a behavior of the user based on the purchase history, the behavior history, and the inventory information,
   estimate a new required power amount of the moving body based on the predicted behavior,
   determine whether the remaining battery level satisfies the new required power amount,
   in a case where the remaining battery level does not satisfy the new required power amount, set, for the moving body, an initial charging travelling route passing a charging path capable of charging the battery on a way from the planned use position to the first destination, and
   output information indicating that the moving body travels on the charging path to the user.

2. The server according to claim 1, wherein
   the processor is configured to:
   in a case where the new second destination different from the first destination is input, estimate a required power amount for travelling from the current position to the second destination based on the current position and the remaining battery level,
   determine whether the remaining battery level is equal to or greater than the required power amount,
   in a case where the remaining battery level is equal to or greater than the required power amount, set, for the moving body, a normal travelling route from the current position to the second destination, and
   in a case where the remaining battery level is less than the required power amount, set the charging travelling route for the moving body.

3. The server according to claim 2, wherein
   the processor is configured to:
   determine whether the battery is chargeable to the required power amount by travelling of the moving body on the charging path,
   in a case where the battery is chargeable to the required power amount, cause the moving body to travel on the charging travelling route, and
   in a case where the battery is not chargeable to the required power amount, dispatch another moving body having the required power amount to a place to which the moving body is capable of travelling with the remaining battery level.

4. A charging system comprising:
   a moving body having a rechargeable battery; and
   a server having a processor configured to acquire a current position of the moving body used by a user, a remaining battery level of the rechargeable battery of the moving body used by the user, and a first destination of the user, and in a case where a new second destination different from the first destination is input, set, for the moving body, a charging travelling route passing a charging path capable of charging the battery on a way from the current position to the second destination based on the remaining battery level,
   the processor being further configured to:
   acquire a planned use position of the user, the first destination of the user, and the remaining battery level,
   estimate an initial required power amount of the battery based on the planned use position and the first destination,
   determine whether the remaining battery level is equal to or greater than the initial required power amount,
   in a case where the remaining battery level is equal to or greater than the initial required power amount, set, for the moving body, an initial travelling route from the planned use position to the first destination, and
   in a case where the remaining battery level is less than the initial required power amount, set, for the moving body, an initial charging travelling route passing a charging path capable of charging the battery on a way from the planned use position to the first destination;

determine whether a business type of the first destination is a retail business, in a case where the first destination is a retail business, acquire a purchase history of the user, a behavior history of the user, and inventory information of the first destination, predict a behavior of the user based on the purchase history, the behavior history, and the inventory information, estimate a new required power amount of the moving body based on the predicted behavior, determine whether the remaining battery level satisfies the new required power amount, in a case where the remaining battery level does not satisfy the new required power amount, set, for the moving body, an initial charging travelling route passing a charging path capable of charging the battery on a way from the planned use position to the first destination, and output information indicating that the moving body travels on the charging path to the user.

5. The charging system according to claim 4, wherein the processor is configured to:

in a case where the new second destination different from the first destination is input, estimate a required power amount for travelling from the current position to the second destination based on the current position and the remaining battery level, determine whether the remaining battery level is equal to or greater than the required power amount, in a case where the remaining battery level is equal to or greater than the required power amount, set, for the moving body, a normal travelling route from the current position to the second destination, and in a case where the remaining battery level is less than the required power amount, set the charging travelling route for the moving body.

6. The charging system according to claim 5, wherein the processor is configured to:

determine whether the battery is chargeable to the required power amount by travelling of the moving body on the charging path, in a case where the battery is chargeable to the required power amount, cause the moving body to travel on the charging travelling route, and in a case where the battery is not chargeable to the required power amount, dispatch another moving body having the required power amount to a place to which the moving body is capable of travelling with the remaining battery level.

7. A non-transitory computer-readable recording medium storing a program for causing a processor to:

acquire a current position of a moving body used by a user, a remaining battery level of a rechargeable battery of the moving body used by the user, and a first destination of the user, and in a case where a new second destination different from the first destination is input, set, for the moving body, a charging travelling route passing a charging path capable of charging the battery on a way from the current position to the second destination based on the remaining battery level, the program further causing the processor to:

acquire a planned use position of the user, the first destination of the user, and the remaining battery level, estimate an initial required power amount of the battery based on the planned use position and the first destination, determine whether the remaining battery level is equal to or greater than the initial required power amount, in a case where the remaining battery level is equal to or greater than the initial required power amount, set, for the moving body, an initial travelling route from the planned use position to the first destination, and in a case where the remaining battery level is less than the initial required power amount, set, for the moving body, an initial charging travelling route passing a charging path capable of charging the battery on a way from the planned use position to the first destination;

determine whether a business type of the first destination is a retail business, in a case where the first destination is a retail business, acquire a purchase history of the user, a behavior history of the user, and inventory information of the first destination, predict a behavior of the user based on the purchase history, the behavior history, and the inventory information, estimate a new required power amount of the moving body based on the predicted behavior, determine whether the remaining battery level satisfies the new required power amount, in a case where the remaining battery level does not satisfy the new required power amount, set, for the moving body, an initial charging travelling route passing a charging path capable of charging the battery on a way from the planned use position to the first destination, and output information indicating that the moving body travels on the charging path to the user.

8. The non-transitory computer-readable recording medium storing the program according to claim 7, wherein the program causes the processor to:

in a case where the new second destination different from the first destination is input, estimate a required power amount for travelling from the current position to the second destination based on the current position and the remaining battery level, determine whether the remaining battery level is equal to or greater than the required power amount, in a case where the remaining battery level is equal to or greater than the required power amount, set, for the moving body, a normal travelling route from the current position to the second destination, and in a case where the remaining battery level is less than the required power amount, set the charging travelling route for the moving body.

9. The non-transitory computer-readable recording medium storing the program according to claim 8, wherein the program causes the processor to:

determine whether the battery is chargeable to the required power amount by travelling of the moving body on the charging path, in a case where the battery is chargeable to the required power amount, cause the moving body to travel on the charging travelling route, and in a case where the battery is not chargeable to the required power amount, dispatch another moving body having the required power amount to a place to which the moving body is capable of travelling with the remaining battery level.

* * * * *